US011913845B2

(12) United States Patent
Bhatia et al.

(10) Patent No.: US 11,913,845 B2
(45) Date of Patent: Feb. 27, 2024

(54) TUNABLE CAPACITANCE-BASED TEMPERATURE SENSOR

(71) Applicant: Temptime Corporation, Morris Plains, NJ (US)

(72) Inventors: Ravi Bhatia, Cedar Knolls, NJ (US); Thi N. Do, West Orange, NJ (US); Brian S. Huffman, Belle Mead, NJ (US); Mohannad Abdo, Clifton, NJ (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 347 days.

(21) Appl. No.: 17/185,381

(22) Filed: Feb. 25, 2021

(65) Prior Publication Data
US 2022/0268640 A1    Aug. 25, 2022

(51) Int. Cl.
*G01K 7/34* (2006.01)
*G01K 1/02* (2021.01)

(52) U.S. Cl.
CPC ...... *G01K 7/34* (2013.01); *G01K 1/02* (2013.01)

(58) Field of Classification Search
CPC .............. G01K 7/34; G01K 1/02; G01K 1/022
USPC ........................................................ 374/184
See application file for complete search history.

(56) References Cited

U.S. PATENT DOCUMENTS

| 4,487,057 | A | * | 12/1984 | Lutz | .................. | G01K 3/00 |
| | | | | | | 324/519 |
| 4,646,066 | A | | 2/1987 | Baughman et al. | | |
| 6,524,697 | B1 | | 2/2003 | Furuyama et al. | | |
| 6,642,016 | B1 | | 11/2003 | Sjoholm et al. | | |
| 6,720,866 | B1 | | 4/2004 | Sorrells et al. | | |
| 7,098,794 | B2 | | 8/2006 | Lindsay et al. | | |
| 7,503,690 | B2 | | 3/2009 | Song et al. | | |
| 7,570,169 | B2 | | 8/2009 | Li et al. | | |
| 7,604,398 | B1 | | 10/2009 | Akers et al. | | |

(Continued)

FOREIGN PATENT DOCUMENTS

| CN | 103543146 | 1/2014 |
| CN | 104599956 | 5/2015 |

(Continued)

OTHER PUBLICATIONS

I. Gascon, J.-D. Marty, T. Gharsa, and C. Mingotaud, 2005. "Formation of Gold Nanoparticles in a Side-Chain Liquid Crystalline Network: Influence of the Structure and Macroscopic Order of the Material" Chem. Mater. 2005, 17, 21, 5228-5230 (Year: 2005).*

(Continued)

*Primary Examiner* — Natalie Huls
*Assistant Examiner* — Cynthia L Davis
(74) *Attorney, Agent, or Firm* — K&L Gates LLP

(57) ABSTRACT

A temperature indicator includes a first capacitor configured to change capacitance when exposed to a temperature above a first threshold temperature, a second capacitor configured to change capacitance when exposed to a temperature above a second threshold temperature. The first capacitor is electrically connected to the second capacitor. The second threshold temperature is different than the first threshold temperature. The first capacitor and the second capacitor retain their changed capacitance permanently after they return to a temperature below their respective threshold temperature.

16 Claims, 9 Drawing Sheets

(56) References Cited

U.S. PATENT DOCUMENTS

| | | | |
|---|---|---|---|
| 7,719,404 B2 | 5/2010 | Makela et al. | |
| 8,040,243 B2 | 10/2011 | Bommer et al. | |
| 8,043,000 B2* | 10/2011 | Sumida | G01K 7/32 |
| | | | 374/102 |
| 8,111,143 B2 | 2/2012 | Tong et al. | |
| 8,228,172 B2 | 7/2012 | Collins et al. | |
| 8,267,576 B2 | 9/2012 | Haarer et al. | |
| 8,395,521 B2 | 3/2013 | Kauffman et al. | |
| 8,870,082 B2 | 10/2014 | Cattaneo et al. | |
| 8,899,829 B1 | 12/2014 | Butera et al. | |
| 8,968,662 B2 | 3/2015 | Haarer et al. | |
| 9,011,794 B2 | 4/2015 | Haarer et al. | |
| 9,195,925 B2 | 11/2015 | Potyrailo et al. | |
| 9,436,853 B1 | 9/2016 | Meyers | |
| 9,546,911 B2* | 1/2017 | Huffman | G01K 1/02 |
| 10,184,777 B2* | 1/2019 | Okojie | G01B 7/08 |
| 10,338,537 B2 | 7/2019 | Braunberger | |
| 2004/0061655 A1 | 4/2004 | Forster et al. | |
| 2006/0261946 A1 | 11/2006 | Himberger et al. | |
| 2007/0210923 A1 | 9/2007 | Butler et al. | |
| 2008/0012580 A1 | 1/2008 | Funo et al. | |
| 2008/0292507 A1 | 11/2008 | Dee et al. | |
| 2009/0010304 A1 | 1/2009 | Skinner et al. | |
| 2009/0066516 A1 | 3/2009 | Lazo | |
| 2010/0001745 A1 | 1/2010 | Sumida et al. | |
| 2010/0090802 A1 | 4/2010 | Nilsson et al. | |
| 2010/0123583 A1 | 5/2010 | Bommer et al. | |
| 2011/0211612 A1 | 9/2011 | Branecky | |
| 2012/0260728 A1 | 10/2012 | Bhattacharyya et al. | |
| 2013/0033364 A1 | 2/2013 | Raz et al. | |
| 2013/0224875 A1 | 8/2013 | Haarer et al. | |
| 2014/0144366 A1 | 5/2014 | Huffman et al. | |
| 2014/0148095 A1 | 5/2014 | Smith et al. | |
| 2014/0154808 A1 | 6/2014 | Patel | |
| 2014/0358099 A1 | 12/2014 | Durgin et al. | |
| 2017/0211992 A1 | 7/2017 | Yeager et al. | |
| 2017/0255854 A1 | 9/2017 | Bhatia et al. | |
| 2017/0370692 A1 | 12/2017 | Okojie | |

FOREIGN PATENT DOCUMENTS

| | | |
|---|---|---|
| DE | 10 2005 061249 | 6/2007 |
| JP | 5723474 | 5/2015 |
| KR | 101519317 | 5/2015 |
| WO | WO03/044521 | 5/2003 |
| WO | WO 20080127044 | 10/2008 |
| WO | WO2014113247 | 10/2014 |
| WO | WO2015113086 | 8/2015 |
| WO | WO2017151731 | 9/2017 |
| WO | WO2020231921 | 11/2020 |

OTHER PUBLICATIONS

Search Report and Written Opinion dated Jul. 7, 2022 issued for International PCT Application No. PCT/US22/17138 filed on Feb. 21, 2022.

Office Action dated Sep. 23, 2019 issued for European Patent Application No. 17760694.4.

Office Action dated Nov. 4, 2020 issued for Chinese Patent Application No. 201780014268.2.

Office Action dated Feb. 25, 2021 issued for Korean Patent Application No. 10-2018-7026541.

Bhattacharyya et al., "Low-Cost, Ubiquitous RFID-Tag-Antenna-Based Sensing", Proceedings of the IEEE 2010, 98, 1593-1600.

Windl et al., "Reactivatable Passive Radio-Frequency Identification Temperature Indicator", Journal of Applied Physics 117, 17C125 (2015).

Tanguy et al. "Enhanced Radio Frequency Biosensor for Food Quality Detection Using Functionalized Carbon Nanofillers", ACS Appl. Mater. Interfaces 2015, 7, 11939-11947.

Wu et al., "3D-Printed Microelectronics for Integrated Circuitry and Passive Wireless Sensors", Microsystems & Nanoengineering 1, 15013 (2015).

Wan et al., "A New Type of TTI Based on Electrochemical Pseudo Transistor", J. of Food. Engin. 168, (2016) 79-83.

Search Report and Written Opinion dated Jul. 17, 2017 issued for International PCT Application No. PCT/US17/20142.

Office Action dated Sep. 19, 2019 issued for European Patent Application No. 17760694.4.

International search report and of a written opinion dated Aug. 10, 2020 issued for International PCT Application No. PCT/US20/32340.

Office Action dated Sep. 3, 2020 issued for European Patent Application No. 17760694.4.

Office Action dated Jan. 7, 2020 issued for European Patent Application No. 17760694.4.

* cited by examiner

TUNABLE CAPACITANCE-BASED TEMPERATURE SENSOR

BACKGROUND

Many commercial products are sensitive to temperature conditions, such as freezing, thawing, high or low temperatures, and/or extended periods of time at elevated temperature, and may lose efficacy or quality under any of these conditions. Examples of temperature-sensitive commercial products include certain pharmaceuticals, medical products, and foodstuffs, as well as some industrial products. There is a continued need for an environmental temperature indicator to detect such changes.

SUMMARY

The present disclosure provides new and innovative temperature indicators and systems for providing an indication of exposure to temperature changes. In some examples, a temperature indicator may include a first capacitor configured to change capacitance when exposed to a temperature above a first threshold temperature and a second capacitor configured to change capacitance when exposed to a temperature above a second threshold temperature. The first capacitor may be electrically connected to the second capacitor. The second threshold temperature may be different than the first threshold temperature. The first capacitor and the second capacitor may retain their changed capacitance permanently after they return to a temperature below their respective threshold temperature.

In some examples, a temperature indicator may include a first temperature-dependent component configured to change conductivity when exposed to a temperature above a first threshold temperature and a second temperature-dependent component electrically connected to the first temperature-dependent component. The second temperature-dependent component may be configured to change conductivity when exposed to a temperature above a second threshold temperature. The second threshold temperature may be different than the first threshold temperature. The first temperature-dependent component and the second temperature-dependent component may retain their changed conductivity permanently after they return to a temperature below their respective threshold temperature.

In some examples, a temperature-sensitive product may include a host product and the temperature indicator mentioned above, and the temperature indicator may be associated with the host product to monitor a temperature change of the host product.

In some examples, an RFID tag may include an antenna and the temperature indicator mentioned above. The temperature indicator may be electrically connected to the antenna. The RFID tag may be configured to change at least one of a frequency response, a resonant frequency, a phase response, a backscatter signal strength, and an antenna gain in response to temperature exposure dependent changes to capacitance of the temperature indicator.

Additional features and advantages of the disclosed systems are described in, and will be apparent from, the following Detailed Description and the Figures.

DETAILED DESCRIPTION OF EXAMPLE EMBODIMENTS

Many vaccines, drugs, foodstuffs, and other products are temperature-sensitive, or perishable, and can lose quality with time at rates which are influenced by ambient temperatures. To help mitigate problems associated with undesirable temperature conditions, a temperature indicator can be associated with the vaccines, drugs, foodstuffs, or other host products that are thermally sensitive, to provide an alerting to a health worker, or other end-user, that the products may have lost potency and possibly should not be used.

It may be desirable to have an indicator that reports historical temperature exposure, e.g., whether the temperature of the product has exceeded a threshold temperature, which may damage certain products. In other situations, it may be desirable to have an indicator which reports if a product is above, or has recently exceeded a threshold temperature, somewhat analogous to a thermometer. These indicators may be provided in a variety of forms, e.g., optically readable indicators. In other cases, either alone or combination with such optical indicators, indicators which signal historical or current temperature with either an electrical signal or a radio signal, such as a signal provided by a radio frequency ID tag (RFID) may be provided. The implementation of such electrical or radio indicators may be facilitated by the use of capacitors or other electrical components which significantly change capacitance or other electrical property in response to temperature exposure above a threshold. In some cases, the response may be irreversible, i.e., the changed electrical property does not return to its original value after the threshold exposure ends.

Figure 1:
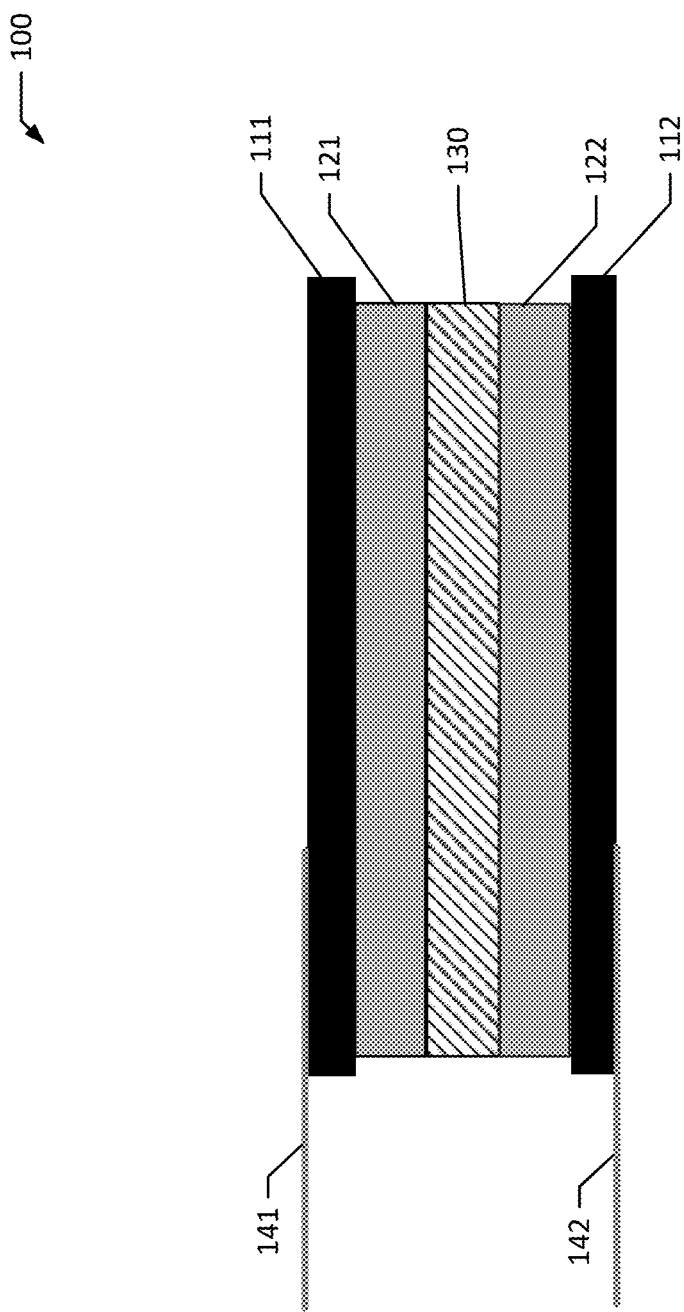
FIG. 1 is a diagram of a temperature indicator according to an example embodiment of the present disclosure.

FIG. 1 depicts an example temperature indicator 100 in accordance with one or more aspects of the present disclosure. The temperature indicator 100 may include a first electrical contact 111 and a second electrical contact 112. The first electrical contact 111 may be connected to a first conducting surface 121, and the second electrical contact 112 may be connected to a second conducting surface 122. A dielectric 130 may be formed between the first conducting surface 121 and the second conducting surface 122. The first electrical contact 111 may be connected to a first contact terminal 141, and the second electrical contact 112 may be connected to a second contact terminal 142.

In some examples, at least one of the first conducting surface 121 and the second conducting surface 122 may include a temperature-dependent component configured to change conductivity when exposed to a temperature above a threshold temperature. The threshold temperature may depend on the material used. Some materials and designs can be tuned, so that the threshold temperature is tied to properties of a perishable product. For example, the threshold temperature can be about 55° C. to about 65° C., about 45° C. to about 55° C., about 35° C. to about 45° C., about 25° C. to about 35° C., about 10° C. to about 25° C., about 65° C. or less, about 60° C. or less, about 55° C. or less, about 50° C. or less, about 45° C. or less, about 40° C. or less, about 35° C. or less, about 30° C. or less, about 25° C. or less, about 20° C. or less, about 15° C. or less, or about 10° C.

In some examples, for vaccines (e.g., yellow fever vaccines, hepatitis vaccines, HPV vaccines, rotavirus vaccines, pneumococcal vaccines, cholera vaccines, etc.) that need to be stored between 2° C. and 8° C., the threshold temperature can be about 8° C. In some examples, for medical supplies, diagnostics kits, and/or Controlled Temperature Chain (CTC) vaccines (e.g., MenAfriVac), the threshold temperature can be about 40° C. In some examples, the threshold temperature can be about 10° C. for blood, about 5° C. to about 8° C. for meats/leafy green vegetables, and about 34° C. for chocolate.

In some examples, at least one of the first conducting surface 121 and the second conducting surface 122 may be made with any other suitable conductive material (e.g., metal). In some examples, the first conducting surface 121 may be made with the temperature-dependent component, and the second conducting surface 122 may be made with another conducting material, e.g., metal, such as copper, aluminum, silver, gold, graphite, conductive polymers, or other conducting materials.

In some examples, after the temperature-dependent component returns to a temperature below the threshold temperature, the temperature-dependent component may retain the changed conductivity. In other examples, after the temperature-dependent component returns to a temperature below the threshold temperature, the temperature-dependent component may not retain the changed conductivity. For example, after the temperature-dependent component returns to a temperature below the threshold temperature, the conductivity of the temperature-dependent component may return to its initial conductivity or a conductivity close to the initial conductivity. Where the temperature dependent components return to their initial conductivity, the indicator may operate like a thermometer or current temperature indicator, or where it returns to initial state more slowly as a recent temperature excursion indicator; where the temperature dependent component does not return to its initial conductivity, the device may operate as a historical temperature exposure indicator.

In some examples, the temperature-dependent component may be conductive before the exposure to the temperature above the threshold temperature and may be insulating after the exposure to the temperature above the threshold temperature. In other examples, the temperature-dependent component may be insulating before the exposure to the temperature above the threshold temperature and may be conductive after the exposure to the temperature above the threshold temperature.

Identifying whether a material is conducting or insulating can be determined by measuring the sheet resistance of the material. The sheet resistance of a suitable conductive material may be about 100 ohms/square or less, such as about 50 ohms/square or less, about 20 ohms/square or less, or about 10 ohms/square or less. The sheet resistance of an insulating material may be about 100,000 ohms/square or more, such as about 1,000,000 ohms/square or more.

In some examples, the change in conductivity of the temperature-dependent component may occur almost immediately or after a relatively short time period of exposure of the temperature-dependent component to the temperature above the threshold temperature. In such cases, the change in conductivity can occur after exposure of the temperature-dependent component for about 30 seconds or less to the temperature above the threshold temperature, such as for about 20 seconds or less, for about 15 seconds or less, for about 10 seconds or less, for about 5 seconds or less, or for about 2 seconds or less. In some cases, the change in conductivity may occur after a relatively longer time period of exposure of the indicator material to the temperature above the threshold temperature. In such cases, the change in conductivity may occur after exposure of the temperature-dependent component for about 1 minute to about 48 hours to the temperature above the threshold temperature, such as for about 1 minute to about 2 minutes, for about 2 minutes to about 5minutes, for about 5 minutes to about 10 minutes, for about 10 minutes to about 30 minutes, for about 30 minutes to about 1 hour, for about 1 hour to about 2 hours, for about 2 hours to about 5 hours, for about 5 hours to about 10 hours, for about 10 hours to about 24 hours, or for about 24 hours to about 48 hours. With a longer times to change property in response to a temperature excursion above the threshold, the indicator may be used as a time-temperature exposure indicator.

In some examples, for each given threshold temperature, the amount of time that is required for the change in conductivity may depend on the difference between the real temperature (to which the temperature-dependent component is exposed) and the given threshold temperature. For example, when the difference between the real temperature and the given threshold temperature is about 0° C. to about 5° C., the amount of time that is required for the change in conductivity may be about 5 minutes to 15 minutes. In some examples, when the difference between the real temperature and the given threshold temperature is about 5° C. to about 10° C., the amount of time that is required for the change in conductivity may be about 1 minutes to 5 minutes. In some examples, when the difference between the real temperature and the given threshold temperature is greater than about 10° C., the amount of time that is required for the change in conductivity may be less than 1 minutes, such as less than 30 seconds, less than 15 seconds, less than 10 seconds, or less than 5 seconds.

The change in conductivity of the temperature-dependent component may be irreversible or reversible. In the case of an irreversible change in conductivity, the changed conductivity may persist after the temperature-dependent component is no longer exposed to the temperature above the threshold temperature. In such cases, after a change in conductivity and after a subsequent exposure to a temperature below the threshold temperature, the temperature-dependent component may retain the changed conductivity. In some cases, the change in conductivity may be considered irreversible when the changed conductivity persists after exposure for at least 48 hours to a temperature below the threshold temperature, such as after exposure for at least 72 hours to a temperature below the threshold temperature, after exposure for at least 120 hours to a temperature below the threshold temperature, or after exposure for at least 168 hours to a temperature below the threshold temperature. Factors influencing the time change include the amount of thermal mass of indicator, the latent heat of fusion of the materials in the indicator, and the insulating properties of materials which may surround the indicator.

In the case of a reversible change in conductivity, the changed conductivity may not persist after the temperature-dependent component is no longer exposed to the temperature above the threshold temperature. In such cases, after a change in conductivity and after a subsequent exposure to a temperature below the threshold temperature, the temperature-dependent component may not retain the changed conductivity and/or may revert to its initial conductivity (or to a conductivity close to the initial conductivity) prior to the exposure to the temperature above the threshold temperature. In some cases, the change in conductivity may be considered reversible when the changed conductivity does not persist after exposure for 168 hours (a week) or less to a temperature below the threshold temperature. For example, the subsequent exposure to the temperature below the threshold temperature may be for about 1 minute to about 168 hours, such as for about 1 minute to about 2 minutes, for about 2 minutes to about 5 minutes, for about 5 minutes to about 10 minutes, for about 10 minutes to about 30 minutes, for about 30 minutes to about 1 hour, for about 1 hour to about 2 hours, for about 2 hours to about 5 hours, for about 5 hours to about 10 hours, for about 10 hours to about 24 hours, for about 24 hours to about 48 hours, for about 48 hours to about 72 hours, for about 72 hours to about 120 hours, or for about 120 hours to about 168 hours.

The first/second electrical contact 111/112 may be made with aluminum, copper, silver, gold, any other suitable metal, or other conductive material. In some examples, the dielectric 130 may be made with at least one of an olefin, polyethylene, silicon dioxide, paper, and air and combinations thereof. In other examples, the dielectric 130 may be made with any other suitable non-conductive/dielectric material.

In some examples, the temperature-dependent component may be made with side-chain crystalline (SCC) polymer and/or conductive particles. In some examples, the side-chain crystalline polymer and conductive particles may be present together as a mixture or blend in a single layer. In some examples, the conductive particles are dispersed or dissolved in the side-chain crystalline polymer, or partially or fully encapsulated by the side-chain crystalline polymer. The conductive particles can be distributed substantially homogeneously or inhomogeneously in the side-chain crystalline polymer.

In some examples, the temperature-dependent component may include a first layer having conductive particles and a matrix material. Suitable matrix materials may include, but are not limited to binders, surfactants, coating additives, and solvents. The temperature-dependent component may further include a layer containing a side-chain crystalline polymer. When the side-chain crystalline polymer melts, it may flow into the layer containing conductive particles and matrix material to effect a change in the conductivity of the layer containing the conductive particles.

The side-chain crystalline polymer and the conductive particles can be present in the temperature-dependent component in various weight ratios. In some examples, the weight ratio of side-chain crystalline polymer to conductive particles in the temperature-dependent component may be about 50:50 to about 20:80, about 45:55 to about 20:80, about 40:60 to about 20:80, about 35:65 to about 20:80, about 30:70 to about 20:80, about 25:75 to about 20:80, about 40:60 to about 25:75, about 35:65 to about 25:75, about 30:70 to about 25:75, about 40:60 to about 30:70, about 35:65 to about 30:70, about 30:70, about 35:65, about 40:60, about 45:55, or about 50:50. In some examples, the weight ratio of side-chain crystalline polymer to conductive particles in the temperature-dependent component is about 1:1.2 to about 1:4, such as about 1:1.3 to about 1:3, about 1:1.3 to about 1:2.5, about 1:1.4 to about 1:2.4, about 1:1.5 to about 1:2.3, about 1:1.6 to about 1:2.4, about 1:1.7 to about 1:2.5, about 1:1.8 to about 1:2.6, about 1:1.9 to about 1:2.7, about 1:2 to about 1:2.6, about 1:2.1 to about 1:2.5, about 1:2.2 to about 1:2.4, or about 1:2.3.

Advantageously, the side-chain crystalline polymer can provide a relatively sharp transition from the solid state to the liquid state. The side-chain crystalline polymer are very tunable and, thus, the properties of the side-chain crystalline polymer (e.g., melting point, tightness of the transition, viscosity, etc.) are readily tuned. The melting range of the side-chain crystalline polymer generally is indicative of the sharpness of the solid state to liquid state transition. In some examples, the side-chain crystalline polymers may have a relatively narrow melting range, for example, a melting range of about 10° C., about 5° C., about 2° C., about 1° C., or about 0.5° C. The side-chain crystalline polymers can also have a relatively low melting temperature, such as about 55° C. to about 65° C., about 45° C. to about 55° C., about 35° C. to about 45° C., about 25° C. to about 35° C., about 10° C. to about 25° C., about 65° C. or less, about 60° C. or less, about 55° C. or less, about 50° C. or less, about 45° C. or less, about 40° C. or less, about 35° C. or less, about 30° C. or less, about 25° C. or less, about 20° C. or less, about 15° C. or less, or about 10° C.

Not wishing to be bound by theory, it is believed that after exposure to a threshold temperature for a sufficient period of time, the side-chain crystalline polymer may melt and thereby separate or re-orient the conductive particles in such a way that the indicator material undergoes a change in conductivity. As used herein, the term "melting temperature" or "melting point" may refer to the temperature at which a material exhibits peak unit heat absorption per degree Celsius, as determined by differential scanning calorimetry. Above its melting temperature, the material can exhibit liquid properties and below its melting temperature, the material can exhibit solid properties. As used herein, the term "melting temperature range" may refer to the temperature range from the melt onset temperature to the melting temperature of a material. As used herein, the term "melt onset temperature" may refer to the temperature at which the meltable material begins to exhibit an increase in unit heat absorption per degree Celsius, as determined by differential scanning calorimetry. Below its melt onset temperature, the material can be solid.

The side-chain crystalline polymer can have a melting temperature close to the threshold temperature of the temperature indicator 100. Thus, for example, the threshold temperature can be about 55° C. to about 65° C., about 45° C. to about 55° C., about 35° C. to about 45° C., about 25° C. to about 35° C., about 10° C. to about 25° C., about 65° C. or less, about 60° C. or less, about 55° C. or less, about 50° C. or less, about 45° C. or less, about 40° C. or less, about 35° C. or less, about 30° C. or less, about 25° C. or less, about 20° C. or less, about 15° C. or less, or about 10° C.

Suitable side-chain crystalline polymers may include polymers and copolymers of methacrylates and acrylates, having linear aliphatic side chains capable of becoming crystalline at a temperature of interest, for example a temperature in the range of from about 10° C. to about 65° C. The side chains can have at least 10 carbon atoms, for example from about 10 to about 30 carbon atoms, such as 10 to 30 carbon atoms, 10 to 24 carbon atoms, 10 to 22 carbon atoms, 10 to 20 carbon atoms, 12 to 18 carbon atoms, 14 to 16 carbon atoms, 14 to 18 carbon atoms, 16 to 18 carbon atoms, 12 to 16 carbon atoms, or 14 to 16 carbon atoms. Some examples of such polymers include poly(alkylmethacrylates) such as poly(hexadecylmethacrylate) or poly(octadecylmethacrylate), poly(alkylacrylates) such as poly(tetradecylacrylate), poly(hexadecylacrylate), or poly(dodecylacrylate), copolymers such as a copolymer of hexadecylacrylate and octadecylmethacrylate, poly(hexylco-dodecylacrylate), a copolymer of tetradecylacrylate and octadecylacrylate, a copolymer of hexadecylmethacrylate and octadecylmethacrylate, and a copolymer of tetradecylacrylate and hexadecylacrylate. Mixtures of two or more of any of the side-chain crystallizable polymers described herein can also be used. Examples of side-chain crystalline polymers also are disclosed in U.S. patent application Ser. No. 14/167,394, titled TIME-TEMPERATURE INDICATOR COMPRISING A SIDE CHAIN CRYSTALLINE POLYMER (Huffman et al.), filed Jan. 29, 2014, which is herein incorporated by reference in its entirety.

The characteristics of the side-chain crystalline polymer can be adjusted by introducing crosslinking into the polymer structure by including one or more crosslinking agents in the polymerization process. For example, a bifunctional acrylic or methacrylic ester, or other suitable compound, such as hexanediol diacrylate, can be included in the polymerization process to function as a crosslinking agent and yield a crosslinked polymer product. By way of example, the side-chain crystalline polymer can be crosslinked to improve the persistence of the changed conductivity, i.e., to increase the time period for which the indicator material can be exposed to a temperature below the threshold temperature before the changed conductivity ceases to persist. In some cases, a relatively low crosslink density, for example from about 0.01 to about 0.09 intermolecular crosslinks per polymer chain, or weight average molecular weight, can be used.

As used herein, the term "molecular weight" may reference a weight average molecular weight, unless the context indicates a number average molecular weight. The side-chain crystalline polymers can have a molecular weight of at least about 1,000 Da, such as at least about 1,500 Da, at least about 2,000 Da, or at least about 5,000 Da. In some examples, the side-chain crystalline polymer may have a molecular weight in a range of about 2,000 Da to about 300,000 Da, such as about 3,000 Da to about 300,000 Da, about 5,000 Da to about 250,000 Da, about 10,000 Da to about 200,000 Da, about 15,000 Da to about 150,000 Da, about 20,000 Da to about 120,000 Da, about 30,000 Da to about 100,000 Da, about 50,000 Da to about 80,000 Da, about 2,000 Da to about 20,000 Da, about 3,000 Da to about 15,000 Da, about 4,000 Da to about 10,000 Da, about 4,000 Da to about 5,000 Da, about 5,000 Da to about 6,000 Da, about 6,000 Da to about 7,000 Da, about 7,000 Da to about 8,000 Da, about 8,000 Da to about 9,000 Da, about 9,000 Da to about 10,000 Da, about 2,000 Da to about 10,000 Da, about 10,000 Da to about 20,000 Da, about 20,000 Da to about 30,000 Da, about 30,000 Da to about 50,000 Da, about 50,000 Da to about 100,000 Da, about 100,000 Da to about 150,000 Da, about 150,000 Da to about 200,000 Da, about 200,000 Da to about 250,000 Da, or about 250,000 Da to about 300,000 Da.

In general, a higher molecular weight side-chain crystalline polymer can have a higher viscosity when in the liquid state at a temperature near its melting point than the corresponding side-chain crystalline polymer with a lower molecular weight. Thus, the characteristics of the side-chain crystalline polymer can also be adjusted by varying the molecular weight of the side-chain crystalline polymer.

The conductive particles can include any suitable conductive material. In some examples, the conductive particles may include copper, silver, gold, aluminum, or a mixture or combination of one or more of the foregoing. The conductive particles can have various particle sizes and shapes. In some examples, the conductive particles may have an average particle size, which may be a volume equivalent sphere diameter, of about 500 nm to about 1,000 µm, such as about 500 nm to about 100 µm, about 500 nm to about 50 µm, about 500 nm to about 10 µm, about 500 nm to about 5 µm, about 500 nm to about 1 µm, about 1 µm to about 2 µm, about 2 µm to about 3 µm, about 3 µm to about 4 µm, about 4 µm to about 5 µm, about 1 µm to about 1,000 µm, about 10 µm to about 500 µm, about 20 µm to about 200 µm, about 25 µm to about 100 µm, about 30 µm to about 50 µm, or about 40 µm. In some examples, the conductive particles have a spherical shape. In some examples, the conductive particles are in the form of flakes, which may also be characterized by an aspect ratio of flake thickness to flake diameter of, for example, of about 1:50 to about 1:1000, about 1:50 to about 1:500, or about 1:100: to about 1:250. More details about the side-chain crystalline polymers and the conductive particles are disclosed in international patent publication no. WO2020/231921, titled TEMPERATURE INDICATOR WITH ELECTROCHEMICAL SWITCH (Huffman et al.), filed May 11, 2020, which is herein incorporated by reference in its entirety.

In some examples, the temperature-dependent component may be made with any other suitable material/device (e.g., a gel having conductive additives, a pH sensitive gel, a dopant, other conductive polymers, such as polyacetylene, polypyrrole, and polyaniline, or combinations thereof) that is configured to change conductivity when exposed to a temperature above a threshold temperature. Examples of such other suitable material/device for the temperature-dependent component are disclosed in U.S. patent application Ser. No. 15/445,363, titled SWITCHABLE RFID ANTENNAS RESPONSIVE TO AN ENVIRONMENTAL SENSOR (Bhatia et al.), filed Feb. 28, 2017, which is herein incorporated by reference in its entirety.

Figure 2:
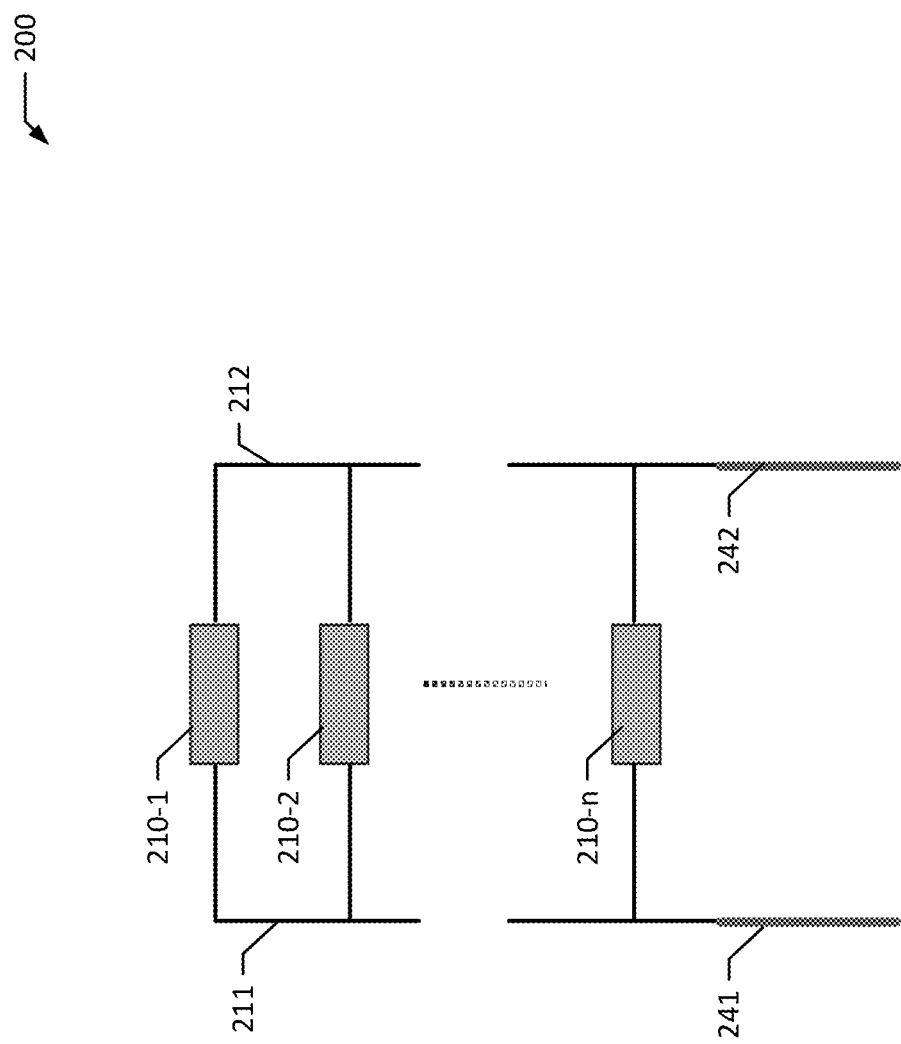
FIG. 2 is a schematic diagram of a temperature indicator according to an example embodiment of the present disclosure.

FIG. 2 illustrates a high-level component diagram of an example temperature indicator 200. The temperature indicator 200 may include two or more circuit components 210-1-210-n. In some examples, the circuit components 210-1-210-n may be connected to each other in parallel as illustrated in FIG. 2. The temperature indicator 200 may further include a first electrical contact 211 connected to one side of each of the circuit components 210-1-210-n, and a second electrical contact 212 connected to the other side of each of the circuit components 210-1-210-n. The first electrical contact 211 and the second electrical contact 212 may be connected to a first contact terminal 241 and a second contact terminal 242, respectively.

In some examples, the circuit components 210-1-210-n may include a temperature-dependent capacitor. In such cases, the circuit components 210-1-210-n may be configured to change capacitance after exposed to a temperature above a threshold temperature. The threshold temperature of each of the circuit components 210-1-210-n can be about 55° C. to about 65° C., about 45° C. to about 55° C., about 35° C. to about 45° C., about 25° C. to about 35° C., about 10° C. to about 25° C., about 65° C. or less, about 60° C. or less, about 55° C. or less, about 50° C. or less, about 45° C. or less, about 40° C. or less, about 35° C. or less, about 30° C. or less, about 25° C. or less, about 20° C. or less, about 15° C. or less, or about 10° C.

In some examples, each of the circuit components 210-1-210-n may have a different threshold temperature from each other. For example, the first circuit component 210-1 may have a first threshold temperature (e.g., 10° C.), the second circuit component 210-2 may have a second threshold temperature (e.g., 20° C.), . . . and the n-th circuit component 210-n may have an n-th threshold temperature (e.g., 65° C.). In some examples, the threshold temperature difference between the circuit components may be 0.1, 1, 5, 10, 15, 20° C., or any other suitable degrees.

In some examples, the circuit components 210-1-210-n may retain their changed capacitance permanently after they return to a temperature below their respective threshold temperature. In the case of an irreversible change in capacitance, the changed capacitance may persist after the circuit component is no longer exposed to the temperature above the respective threshold temperature. In such cases, after a change in capacitance and after a subsequent exposure to a temperature below the respective threshold temperature, the circuit components may retain the changed capacitance. The change in capacitance may be considered irreversible when the changed capacitance persists after exposure for at least 48 hours to a temperature below the threshold temperature, such as after exposure for at least 72 hours to a temperature below the threshold temperature, after exposure for at least 120 hours to a temperature below the threshold temperature, or after exposure for at least 168 hours to a temperature below the threshold temperature.

In other examples, the circuit components 210-1-210-n may not retain their changed capacitance after they return to a temperature below their respective threshold temperature. In the case of a reversible change in capacitance, the changed capacitance may not persist after the circuit component is no longer exposed to the temperature above the threshold temperature. In such cases, after a change in capacitance and after a subsequent exposure to a temperature below the threshold temperature, the circuit component may not retain the changed capacitance and may revert to its initial capacitance (or to a capacitance close to the initial capacitance) prior to the exposure to the temperature above the threshold temperature. In some examples, the change in capacitance would be considered reversible when the changed capacitance does not persist after exposure for 168 hours (a week) or less to a temperature below the threshold temperature. For example, the subsequent exposure to the temperature below the threshold temperature may be for about 1 minute to about 168 hours, such as for about 1 minute to about 2 minutes, for about 2 minutes to about 5 minutes, for about 5 minutes to about 10 minutes, for about 10 minutes to about 30 minutes, for about 30 minutes to about 1 hour, for about 1 hour to about 2 hours, for about 2 hours to about 5 hours, for about 5 hours to about 10 hours, for about 10 hours to about 24 hours, for about 24 hours to about 48 hours, for about 48 hours to about 72 hours, for about 72 hours to about 120 hours, or for about 120 hours to about 168 hours.

In some examples, the change in capacitance of the circuit components 210-1-210-n may occur after exposure to the temperature above the respective threshold temperature for a predetermined amount of time or less. In some examples, the change in capacitance of the circuit components 210-1-210-n may occur almost immediately or after a relatively short time period of exposure to the temperature above the respective threshold temperature. In such cases, the change in capacitance can occur after exposure of the circuit components 210-1-210-n for about 30 seconds or less to the temperature above the threshold temperature, such as for about 20 seconds or less, for about 15 seconds or less, for about 10 seconds or less, for about 5 seconds or less, or for about 2 seconds or less.

In some cases, the change in capacitance may occur after a relatively longer time period of exposure of the circuit components 210-1-210-n to the temperature above the respective threshold temperature. In such cases, the change in capacitance may occur after exposure of the circuit components 210-1-210-n for about 1 minute to about 48 hours to the temperature above the threshold temperature, such as for about 1 minute to about 2 minutes, for about 2 minutes to about 5 minutes, for about 5 minutes to about 10 minutes, for about 10 minutes to about 30 minutes, for about 30 minutes to about 1 hour, for about 1 hour to about 2 hours, for about 2 hours to about 5 hours, for about 5 hours to about 10 hours, for about 10 hours to about 24 hours, or for about 24 hours to about 48 hours. In other examples, the predetermined amount of time may be any other suitable time.

In some examples, for each given threshold temperature, the amount of time that is required for the change in capacitance may depend on the difference between the real temperature (to which the temperature-dependent component is exposed) and the given threshold temperature. For example, when the difference between the real temperature and the given threshold temperature is about 0° C. to about 5° C., the amount of time that is required for the change in capacitance may be about 5 minutes to 15 minutes. In some examples, when the difference between the real temperature and the given threshold temperature is about 5° C. to about 10° C., the amount of time that is required for the change in capacitance may be about 1 minutes to 5 minutes. In some examples, when the difference between the real temperature and the given threshold temperature is greater than about 10° C., the amount of time that is required for the change in capacitance may be less than 1 minutes, such as less than 30 seconds, less than 15 seconds, less than 10 seconds, or less than 5 seconds.

In some examples, at least one of the circuit components 210-1-210-n may include a temperature-dependent component, such as a side-chain crystalline polymer and conductive particles. The configuration/feature/characteristic of the temperature-dependent component may be similar to and/or same as the ones described above and, thus, duplicate description may be omitted.

In some examples, each of the circuit components 210-1-210-n may have a first capacitance value before exposure to the temperature above the respective threshold temperature, and a second capacitance value after exposure to the temperature above the respective threshold temperature. In some examples, the first capacitance is greater than the second capacitance. In this case, in some examples, the second capacitance is zero. In some examples, the first capacitance may be in a range of from about 30 pF to about 50 pF, from about 50 pF to about 70 pF, from about 70 pF to about 90 pF, from about 90 pF to about 110 pF, from about 110 pF to about 130 pF, or from about 130 pF to about 150 pF. In other examples, the first capacitance may have any other suitable capacitance value. In some examples, the second capacitance may be in a range of from about 0 pF to about 0.5 pF, from about 0.5 pF to about 1.0 pF, from about 1.0 pF to about 1.5 pF, from about 1.5 pF to about 2.0 pF, from about 2.0 pF to about 2.5 pF, or from about 2.5 pF to about 3.0 pF. In other examples, the second capacitance may have any other suitable capacitance value.

In other examples, the second capacitance is greater than the first capacitance. In this case, in some examples, the first capacitance is zero. In some examples, the second capacitance may be in a range of from about 30 pF to about 50 pF, from about 50 pF to about 70 pF, from about 70 pF to about 90 pF, from about 90 pF to about 110 pF, from about 110 pF to about 130 pF, or from about 130 pF to about 150 pF. In other examples, the second capacitance may have any other suitable capacitance value. In some examples, the first capacitance may be in a range of from about 0 pF to about 0.5 pF, from about 0.5 pF to about 1.0 pF, from about 1.0 pF to about 1.5 pF, from about 1.5 pF to about 2.0 pF, from about 2.0 pF to about 2.5 pF, or from about 2.5 pF to about 3.0 pF. In other examples, the first capacitance may have any other suitable capacitance value.

After exposure to the temperature above the respective threshold temperature, the change in capacitance of the circuit components 210-1-210-$n$ may occur abruptly (e.g., a couple orders of magnitude change, or at least about a 30 fold difference, 40 fold difference, or 50 fold difference), thereby, working like an on/off switch (between two capacitance values).

In some examples, the first capacitance of each of the circuit components 210-1-210-$n$ may be the same as each other, and the second capacitance of each of the circuit components 210-1-210-$n$ may be the same as each other. In other examples, the first capacitance of each of the circuit components 210-1-210-$n$ may be different from each other, and the second capacitance of each of the circuit components 210-1-210-$n$ may be different from each other. In other examples, the circuit components 210-1-210-$n$ may have any other suitable capacitance values (e.g., some circuit components have the same value to each other and other circuit components have different values from each other) before and after exposure to the temperature above the respective threshold temperature.

In some examples, the total capacitance of the temperature indicator 200 may change as the temperature indicator 200 goes through a temperature change in the range that passes the respective threshold temperature of any one of the circuit components 210-1-210-$n$. For example, assuming that the threshold temperature of each the circuit components 210-1-210-$n$ increases from the first circuit component 210-1 ($T_1$) to the n-th circuit component 210-$n$ ($T_n$), the temperature indicator 200 may have a first total capacitance value ($C_{tot-1}$) before the temperature indicator 200 is exposed to the temperature above the first threshold temperature ($T_1$) of the first circuit component 210-1, a second total capacitance value ($C_{tot-2}$) after the temperature indicator is exposed to a temperature between the first threshold temperature ($T_1$) and the second threshold temperature ($T_2$) of the second circuit component 210-2, a third total capacitance value ($C_{tot-3}$) after the temperature indicator is exposed to a temperature between the second threshold temperature ($T_2$) and the third threshold temperature ($T_3$) of the third circuit component 210-3, . . . and an n+1-th total capacitance value ($C_{tot-n+1}$) after the temperature indicator is exposed to the temperature above the n-th threshold temperature ($T_n$) of the n-th circuit component 210-$n$. In some examples, the total capacitance value may increase from the first total capacitance value ($C_{tot-1}$) to the n+1-th total capacitance value ($C_{tot-n}$). In other examples, the total capacitance value may decrease from the first total capacitance value ($C_{tot-1}$) to the n+1-th total capacitance value ($C_{tot-n+1}$).

In some examples, each of the circuit components 210-1-210-$n$ may include a dielectric. In some examples, the dielectric may include at least one of an olefin, polyethylene, silicon dioxide, paper, and air and combinations thereof. In other examples, the dielectric may include any other suitable non-conductive/dielectric material.

In some examples, the circuit components 210-1-210-$n$ may include a temperature-dependent resistor. In such cases, the circuit components 210-1-210-$n$ may be configured to change resistance after exposed to a temperature above a threshold temperature. Other configuration/feature/characteristic of the circuit components 210-1-210-$n$ (e.g., threshold temperature characteristic) may be similar to and/or same as the ones described above and, thus, duplicate description may be omitted.

In some examples, the circuit components 210-1-210-$n$ may retain their changed resistance permanently after they return to a temperature below their respective threshold temperature. In the case of an irreversible change in resistance, the changed resistance may persist after the circuit component is no longer exposed to the temperature above the respective threshold temperature. In such cases, after a change in resistance and after a subsequent exposure to a temperature below the respective threshold temperature, the circuit components may retain the changed resistance. The change in resistance may be considered irreversible when the changed resistance persists after exposure for at least 48 hours to a temperature below the threshold temperature, such as after exposure for at least 72 hours to a temperature below the threshold temperature, after exposure for at least 120 hours to a temperature below the threshold temperature, or after exposure for at least 168 hours to a temperature below the threshold temperature.

In other examples, the circuit components 210-1-210-$n$ may not retain their changed resistance after they return to a temperature below their respective threshold temperature. In the case of a reversible change in resistance, the changed resistance may not persist after the circuit component is no longer exposed to the temperature above the threshold temperature. In such cases, after a change in resistance and after a subsequent exposure to a temperature below the threshold temperature, the circuit component may not retain the changed resistance and may revert to its initial resistance (or to a resistance close to the initial resistance) prior to the exposure to the temperature above the threshold temperature. In some examples, the change in resistance would be considered reversible when the changed resistance does not persist after exposure for 168 hours (a week) or less to a temperature below the threshold temperature. For example, the subsequent exposure to the temperature below the threshold temperature may be for about 1 minute to about 168 hours, such as for about 1 minute to about 2 minutes, for about 2 minutes to about 5 minutes, for about 5 minutes to about 10 minutes, for about 10 minutes to about 30 minutes, for about 30 minutes to about 1 hour, for about 1 hour to about 2 hours, for about 2 hours to about 5 hours, for about 5 hours to about 10 hours, for about 10 hours to about 24 hours, for about 24 hours to about 48 hours, for about 48 hours to about 72 hours, for about 72 hours to about 120 hours, or for about 120 hours to about 168 hours.

In some examples, the change in resistance of the circuit components 210-1-210-$n$ may occur after exposure to the temperature above the respective threshold temperature for a predetermined amount of time or less. In some cases, the change in resistance may occur almost immediately or after a relatively short time period of exposure of the circuit components 210-1-210-$n$ to the temperature above the threshold temperature. In such cases, the change in resistance can occur after exposure of the circuit components 210-1-210-n for about 30 seconds or less to the temperature above the respective threshold temperature, such as for about 20 seconds or less, for about 15 seconds or less, for about 10 seconds or less, for about 5 seconds or less, or for about 2 seconds or less.

In some cases, the change in resistance may occur after a relatively longer time period of exposure of the circuit components 210-1-210-n to the temperature above the respective threshold temperature. In such cases, the change in resistance may occur after exposure of the circuit components 210-1-210-n for about 1 minute to about 48 hours to the temperature above the respective threshold temperature, such as for about 1 minute to about 2 minutes, for about 2 minutes to about 5 minutes, for about 5 minutes to about 10 minutes, for about 10 minutes to about 30 minutes, for about 30 minutes to about 1 hour, for about 1 hour to about 2 hours, for about 2 hours to about 5 hours, for about 5 hours to about 10 hours, for about 10 hours to about 24 hours, or for about 24 hours to about 48 hours.

In some examples, for each given threshold temperature, the amount of time that is required for the change in resistance may depend on the difference between the real temperature (to which the circuit component is exposed) and the given threshold temperature. For example, when the difference between the real temperature and the given threshold temperature is about 0° C. to about 5° C., the amount of time that is required for the change in resistance may be about 5 minutes to 15 minutes. In some examples, when the difference between the real temperature and the given threshold temperature is about 5° C. to about 10° C., the amount of time that is required for the change in resistance may be about 1 minutes to 5 minutes. In some examples, when the difference between the real temperature and the given threshold temperature is greater than about 10° C., the amount of time that is required for the change in resistance may be less than 1 minutes, such as less than 30 seconds, less than 15 seconds, less than 10 seconds, or less than 5 seconds.

In some examples, at least one of the circuit components 210-1-210-n may include a temperature-dependent component, such as a side-chain crystalline polymer and conductive particles. The configuration/feature/characteristic of the temperature-dependent component may be similar to and/or same as the ones described above and, thus, duplicate description may be omitted.

In some examples, each of the circuit components 210-1-210-n may have a first resistance value before exposure to the temperature above the respective threshold temperature, and a second resistance value after exposure to the temperature above the respective threshold temperature. In some examples, the first resistance is greater than the second resistance. In other examples, the second resistance is greater than the first resistance. In some examples, the first resistance of each of the circuit components 210-1-210-n may be the same as each other, and the second resistance of each of the circuit components 210-1-210-n may be the same as each other. In other examples, the first resistance of each of the circuit components 210-1-210-n may be different from each other, and the second resistance of each of the circuit components 210-1-210-n may be different from each other. In other examples, the circuit components 210-1-210-n may have any other suitable resistance values (e.g., some circuit components have the same value and other circuit components have different values) before and after exposure to the temperature above the respective threshold temperature.

In some examples, the total resistance of the temperature indicator 200 may change as the temperature indicator 200 goes through a temperature change in the range that passes the threshold temperature(s) of any one of the circuit components 210-1-210-n. For example, assuming that the threshold temperature of each of the circuit components 210-1-210-n increases from the first circuit component 210-1 ($T_1$) to the n-th circuit component 210-n ($T_n$), the temperature indicator 200 may have a first total resistance value ($R_{tot-1}$) before the temperature indicator 200 is exposed to the temperature above the first threshold temperature ($T_1$) of the first circuit component 210-1, a second total resistance value ($R_{tot-2}$) after the temperature indicator is exposed to a temperature between the first threshold temperature ($T_1$) and the second threshold temperature ($T_2$) of the second circuit component 210-2, a third total resistance value ($R_{tot-3}$) after the temperature indicator is exposed to a temperature between the second threshold temperature ($T_2$) and the third threshold temperature ($T_3$) of the third circuit component 210-3, . . . and an n+1-th total resistance value ($R_{tot-n+1}$) after the temperature indicator is exposed to the temperature above the n-th threshold temperature ($T_n$) of the n-th circuit component 210-n. In some examples, the total resistance value may increase from the first total resistance value ($R_{tot-}$) to the n+1-th total resistance value ($R_{tot-n}$). In other examples, the total resistance value may decrease from the first total resistance value ($R_{tot-1}$) to the n+1-th total resistance value ($R_{tot-n+1}$).

Figure 3:
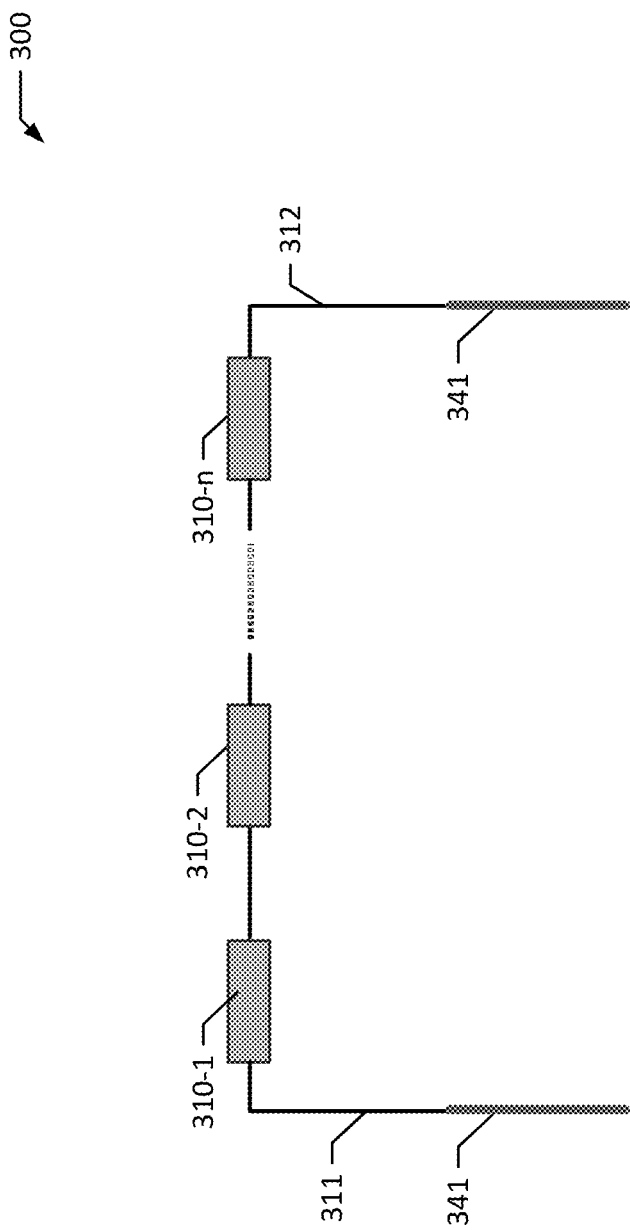
FIG. 3 is a schematic diagram of a temperature indicator according to an example embodiment of the present disclosure.

FIG. 3 illustrates a high-level component diagram of an example temperature indicator 300. The example temperature indicator 300 may include two or more circuit components 310-1-310-n. In some examples, the circuit components 310-1-310-n may be connected in series as illustrated in FIG. 3. The temperature indicator 300 may further include a first electrical contact 311 connected to one side of a first circuit component 310-1 and a second electrical contact 312 connected to one side of a last circuit component 310-n. The first electrical contact 311 and the second electrical contact 312 may be connected to a first contact terminal 341 and a second contact terminal 342, respectively.

In some examples, the circuit components 310-1-310-n may include a temperature-dependent capacitor. In such cases, the circuit components 310-1-310-n may be configured to change capacitance after exposed to a temperature above a threshold temperature. Other configuration/feature/characteristic of the circuit components 310-1-310-n (e.g., threshold temperature, reversibility, response time, material, capacitance value change, etc.) may be similar to and/or same as the ones described above and, thus, duplicate description may be omitted.

In some examples, the total capacitance of the temperature indicator 300 may change as the temperature indicator 300 goes through a temperature change in the range that passes the threshold temperature(s) of any one of the circuit components 310-1-310-n. For example, assuming that the threshold temperature of each the circuit components 310-1-310-n increases from the first circuit component 310-1 ($T_1$) to the n-th circuit component 310-n ($T_n$), the temperature indicator 300 may have a first total capacitance value ($C_{tot-1}$) before the temperature indicator 300 is exposed to the temperature above the first threshold temperature ($T_1$) of the first circuit component 310-1, a second total capacitance value ($C_{tot-2}$) after the temperature indicator is exposed to a temperature between the first threshold temperature ($T_1$) and the second threshold temperature ($T_2$) of the second circuit component 310-2, a third total capacitance value ($C_{tot-3}$) after the temperature indicator is exposed to a temperature between the second threshold temperature ($T_2$) and the third threshold temperature ($T_3$) of the third circuit component 210-3, . . . and an n+1-th total capacitance value ($C_{tot-n+1}$) after the temperature indicator is exposed to the temperature above the n-th threshold temperature ($T_n$) of the n-th circuit component 310-n. In some examples, the total capacitance value may increase from the first total capacitance value ($C_{tot-1}$) to the n+1-th total capacitance value ($C_{tot-n}$). In other examples, the total capacitance value may decrease from the first total capacitance value ($C_{tot-1}$) to the n+1-th total capacitance value ($C_{tot-n+1}$).

In some examples, the circuit components 310-1-310-n may include a temperature-dependent resistor. In such cases, the circuit components 310-1-310-n may be configured to change resistance after exposed to a temperature above a threshold temperature. Other configuration/feature/characteristic of the circuit components 310-1-310-n (e.g., threshold temperature, reversibility, response time, material, resistance value change, etc.) may be similar to and/or same as the ones described above and, thus, duplicate description may be omitted.

In some examples, the total resistance of the temperature indicator 300 may change as the temperature indicator 300 goes through a temperature change in the range that passes the threshold temperature(s) of any one of the circuit components 310-1-310-n. For example, assuming that the threshold temperature of each of the circuit components 310-1-310-n increases from the first circuit component 310-1 ($T_1$) to the n-th circuit component 310-n ($T_n$), the temperature indicator 300 may have a first total resistance value ($R_{tot-1}$) before the temperature indicator 300 is exposed to the temperature above the first threshold temperature ($T_1$) of the first circuit component 310-1, a second total resistance value ($R_{tot-2}$) after the temperature indicator is exposed to a temperature between the first threshold temperature ($T_1$) and the second threshold temperature ($T_2$) of the second circuit component 310-2, a third total resistance value ($R_{tot-3}$) after the temperature indicator is exposed to a temperature between the second threshold temperature ($T_2$) and the third threshold temperature ($T_3$) of the third circuit component 210-3, . . . and an n+1-th total resistance value ($R_{tot-n+1}$) after the temperature indicator is exposed to the temperature above the n-th threshold temperature ($T_n$) of the n-th circuit component 310-n. In some examples, the total resistance value may increase from the first total resistance value ($R_{tot-1}$) to the n+1-th total resistance value ($R_{tot-n}$). In other examples, the total resistance value may decrease from the first total resistance value ($R_{tot-1}$) to the n+1-th total resistance value ($R_{tot-n+1}$).

After exposure to the temperature above the respective threshold temperature, the change in resistance of the circuit components 310-1-310-n may occur abruptly (e.g., a couple orders of magnitude change), thereby, working like an on/off switch (between two resistance values).

In some examples, the circuit components 210-1-210-n and the circuit components 310-1-310-n may include a combination of the temperature-dependent resistors and the temperature-dependent capacitors. In some examples, based on the temperature-dependent resistors and the temperature-dependent capacitors, the circuit components 210-1-210-n and the circuit components 310-1-310-n may include a temperature-dependent RC circuit. In such cases, the circuit components 210-1-210-n and the circuit components 310-1-310-n may be configured to change the magnitude and phase response after exposed to a temperature above a respective threshold temperature.

Figure 4:
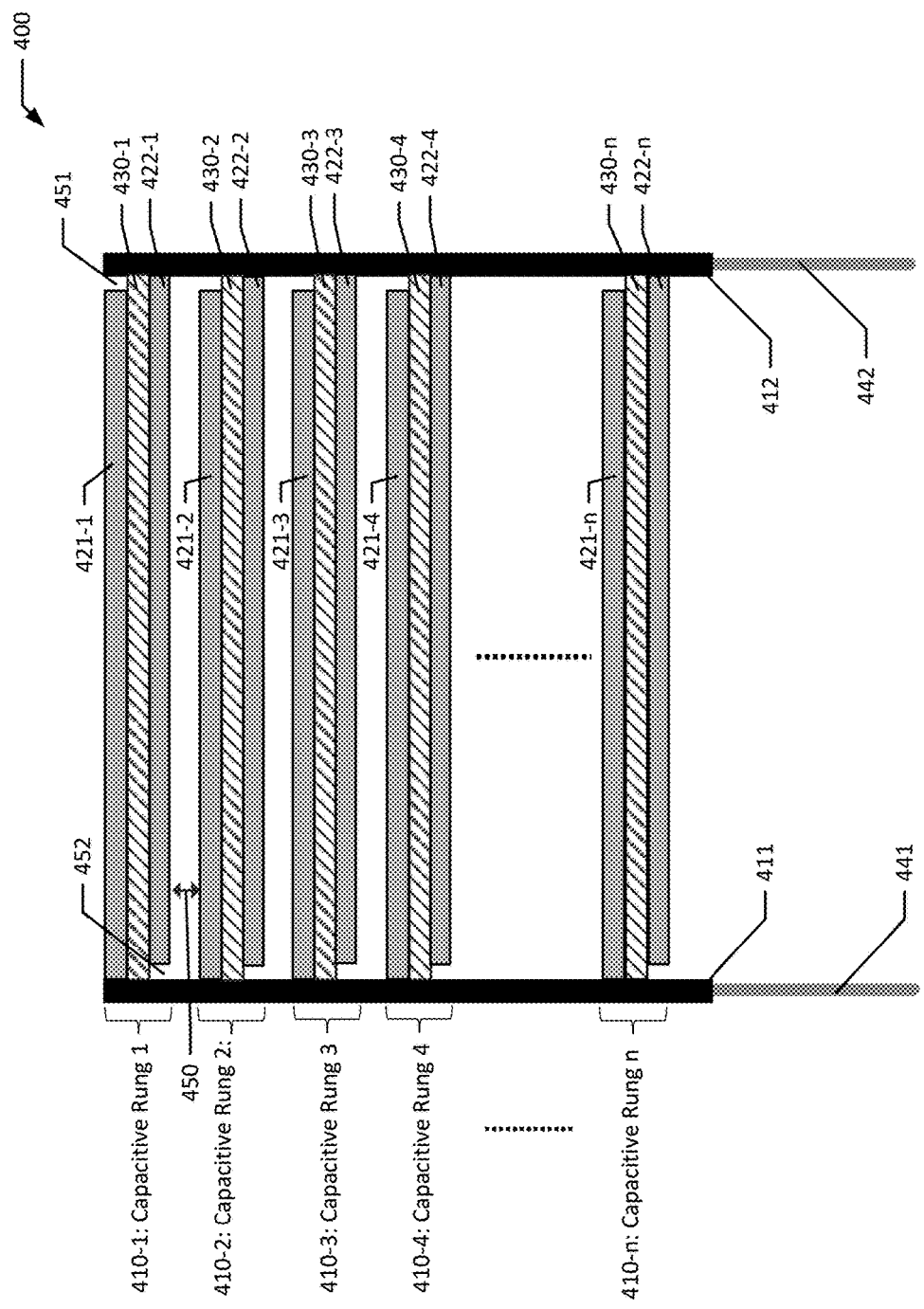
FIG. 4 is a diagram of a temperature indicator according to an example embodiment of the present disclosure.

FIG. 4 illustrates a temperature indicator 400 according to an example embodiment of the present disclosure. The example temperature indicator 400 may include two or more temperature-dependent capacitors 410-1-410-n (e.g., capacitive rungs 1-n). The temperature-dependent capacitors 410-1-410-n may be connected to each other in parallel as illustrated in FIG. 4. The temperature indicator 400 may further include a first electrical contact 411 connected to one side of each of the capacitors 410-1-410-n, and a second electrical contact 412 connected to the other side of each of the capacitors 410-1-410-n. The first electrical contact 411 and the second electrical contact 412 may be connected to a first contact terminal 441 and a second contact terminal 442, respectively.

The temperature-dependent capacitors 410-1-410-n may be configured to change capacitance after exposed to a temperature above a respective threshold temperature. Other general configuration/feature/characteristic of the temperature-dependent capacitors 410-1-410-n (e.g., threshold temperature, threshold temperature difference, reversibility, response time, capacitance value change, etc.) may be similar to and/or same as the circuit components 210-1-210-n (e.g., when serving as a temperature-dependent capacitor) described above and, thus, duplicate description may be omitted.

In some examples, the capacitors 410-1-410-n may include a first conducting surface 421-1-421-n electrically connected to the first electrical contact 411, a second conducting surface 422-1-422-n electrically connected to the second electrical contact 412; and a dielectric 430-1-430-n formed between the first conducting surface and the second conducting surface. In some examples, at least one of the first conducting surface 421-1-421-n and the second conducting surface 422-1-422-n may be a temperature-dependent component. The temperature-dependent component may be configured to change conductivity when exposed to a temperature above a respective threshold temperature. In some examples, the temperature-dependent component may be made with side-chain crystalline polymer and/or conductive particles. Other configuration/feature/characteristic of the temperature-dependent component may be similar to and/or same as the ones described above and, thus, duplicate description may be omitted. In some examples, at least one of the first conducting surface 421-1-421-n and the second conducting surface 422-1-422-n may be made with any other suitable conductive material (e.g., temperature independent conductive material, such as metal). In some examples, the first conducting surface 421-1-421-n may be made with the temperature-dependent component, and the second conducting surface 422-1-422-n may be made with a temperature independent conductive material.

In some examples, the temperature-dependent component of each of the capacitors 410-1-410-n may have a different threshold temperature from each other. For example, the temperature-dependent component of the first capacitor 410-1 may have a first threshold temperature (e.g., 10° C.), the temperature-dependent component of the second capacitor 410-2 may have a second threshold temperature (e.g., 20° C.), . . . and the temperature-dependent component of the n-th capacitor 410-n may have an n-th threshold temperature (e.g., 65° C.). In some examples, the difference of the threshold temperature of the temperature-dependent components between adjacent capacitors may be 5, 10, 15, 20° C., or any other suitable degrees.

In some examples, the capacitors 410-1-410-$n$ may have a (ladder) rung shape. In some examples, the first electrical contact 411, the second electrical contact 412, the capacitors (capacitor rungs) 410-1-410-$n$ may form a ladder structure as illustrated in FIG. 4. In some examples, a first gap 450 may be formed between the adjacent capacitor rungs 410-1-410-$n$. In some examples, a first gap 451 may be formed between the first conducting surface 421-1-421-$n$ and the second electrical contact 412. In some examples, a second gap 452 may be formed between the second conducting surface 422-1-422-$n$ and the first electrical contact 411.

In some examples, the size of the first/second conducting surface may be about 0.01 to about 0.05 square inches, about 0.05 to about 0.15 square inches, about 0.15 to about 0.5 square inches, or about 0.5 to about 1.0 square inches. In other examples, the first/second conducting surface may have any other suitable size. In some examples, the thickness of the first/second conducting surface may be about 1 to about 5 mil, about 5 to about 15 mil, about 15 to about 50 mil, or about 50 to about 100 mil. In other examples, the first/second conducting surface may have any other suitable thickness. In some examples, the thickness of the dielectric 430-1-430-$n$ may be about 0.1 to about 0.5 mil, about 0.5 to about 1.5 mil, about 1.5 to about 5.0 mil, or about 5.0 to about 10.0 mil. In other examples, the dielectric may have any other suitable thickness. In some examples, the dielectric may include at least one of an olefin, polyethylene, silicon dioxide, paper, and air and combinations thereof. In some examples, the dielectric may include any other suitable non-conductive/dielectric material.

In some examples, the length of the gaps 450, 451, and 452 may be a couple orders of magnitude higher than the thickness of the dielectric so that any parasitic capacitance formed with the gaps 450, 451, and 452 becomes negligible (e.g., compared to the capacitances of the capacitors 410-1-410-$n$). In some examples, the gaps 450, 451, and 452 may be filed with air. In other examples, the gaps 450, 451, and 452 may be filed with any other suitable nonconductive material.

After exposure to the temperature above the respective threshold temperature, the change in capacitance of the capacitors 410-1-410-$n$ may occur abruptly (e.g., a couple orders of magnitude change, or at least about 30 fold difference, 40 fold difference, or 50 fold difference), thereby, working like an on/off switch (between two capacitance values). The abrupt change in capacitance of the temperature-dependent capacitors 410-1-410-$n$ may occur by the change in conductivity of the temperature-dependent component in each of the capacitors 410-1-410-$n$, which practically brings the temperature-dependent capacitors in and out of the parallel capacitor structure (e.g., turning on/off or activating/de-activing each capacitor) as the temperature indicator 400 goes through a temperature change (in the range passing the respective threshold temperature(s)).

Figure 5:
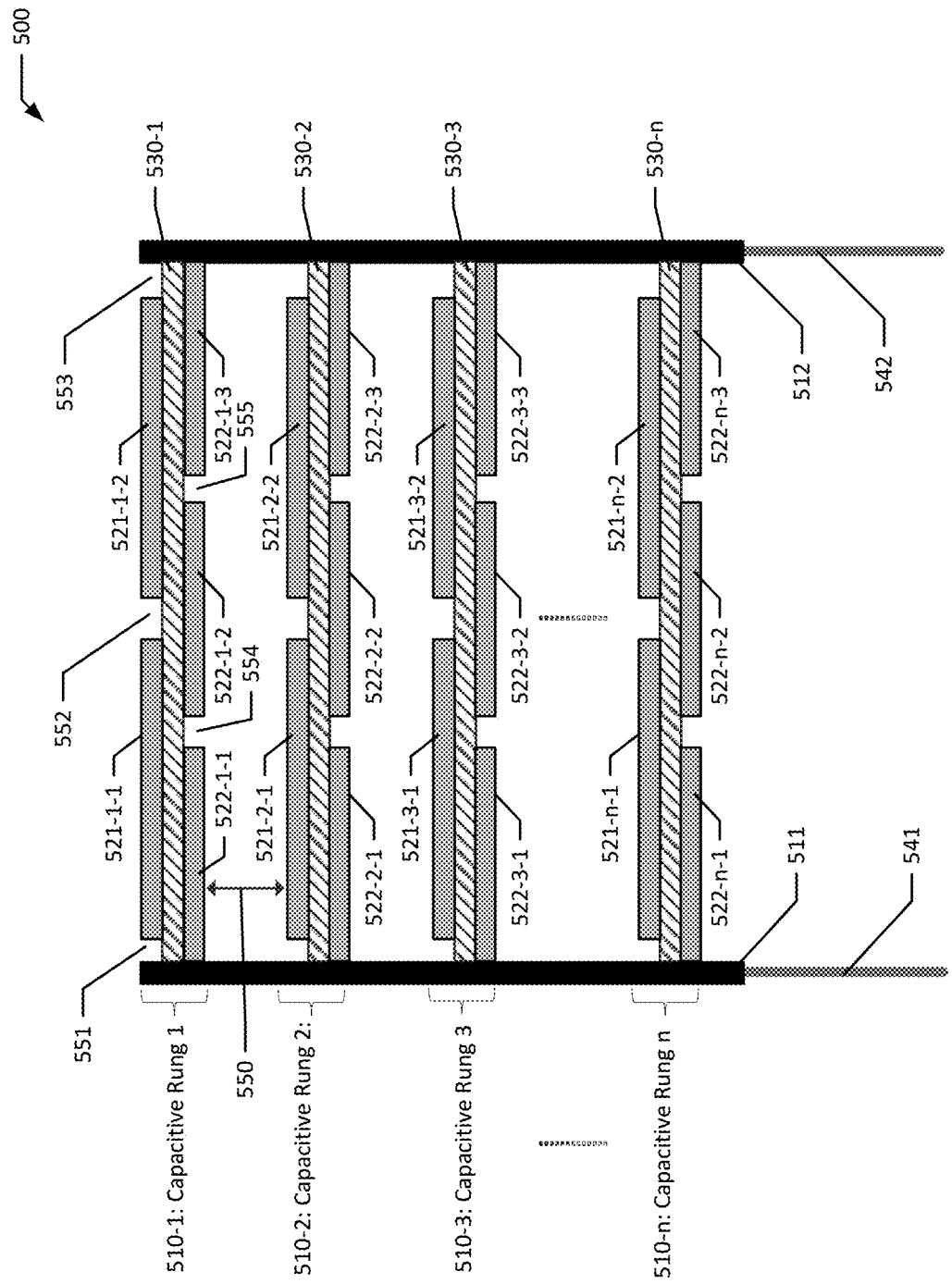
FIG. 5 is a diagram of a temperature indicator according to an example embodiment of the present disclosure.

FIG. 5 illustrates a temperature indicator 500 according to an example embodiment of the present disclosure. Similar to the temperature indicator 400, the example temperature indicator 500 may include two or more temperature-dependent capacitor groups (e.g., capacitive rungs) 510-1-510-$n$. The temperature-dependent capacitor groups 510-1-510-$n$ may be connected to each other in parallel as illustrated in FIG. 5. The temperature indicator 500 may further include a first electrical contact 511 connected to one side of each of the capacitor groups 510-1-510-$n$, and a second electrical contact 512 connected to the other side of each of the capacitor groups 510-1-510-$n$. The first electrical contact 511 and the second electrical contact 512 may be connected to a first contact terminal 541 and a second contact terminal 542, respectively.

The temperature-dependent capacitor groups 510-1-510-$n$ may be configured to change capacitance after exposed to a temperature above a respective threshold temperature. Other general configuration/feature/characteristic of the temperature-dependent capacitor groups 510-1-510-$n$ (e.g., threshold temperature, threshold temperature difference, reversibility, response time, capacitance value change, etc.) may be similar to and/or same as the circuit components 210-1-210-$n$ (e.g., when serving as a temperature-dependent capacitor) and the temperature-dependent capacitors 410-1-410-$n$ described above and, thus, duplicate description may be omitted.

In some examples, the capacitor groups 510-1-510-$n$ may include a first conducting surface group comprising a plurality of first conducting surfaces 521-1-1-521-$n$-1, 521-1-2-521-$n$-2, a second conducting surface group comprising a plurality of second conducting surfaces 522-1-1-522-$n$-1, 522-1-2-522-$n$-2, 522-1-3-522-$n$-3, and a dielectric 530-1-530-$n$ formed between the first conducting surface group and the second conducting surface group. The first conducting surfaces 521-1-1-521-$n$-1, 521-1-2-521-$n$-2 may be separated from the first and second electrical contacts 511, 512, for example, via gaps 551 and 553.

In some examples, at least one of the first conducting surfaces 521-1-1-521-$n$-1, 521-1-2-521-$n$-2 and the second conducting surfaces 522-1-1-522-$n$-1, 522-1-2-522-$n$-2, 522-1-3-522-$n$-3 may be a temperature-dependent component. The temperature-dependent component may be configured to change conductivity when exposed to a temperature above a respective threshold temperature. In some examples, the temperature-dependent component may be made with side-chain crystalline polymer and/or conductive particles. Other configuration/feature/characteristic of the temperature-dependent component may be similar to and/or same as the ones described above and, thus, duplicate description may be omitted. In some examples, at least one of the first conducting surfaces 521-1-1-521-$n$-1 and 521-1-2-521-$n$-2 and the second conducting surfaces 522-1-1-522-$n$-1, 522-1-2-522-$n$-2, 522-1-3-522-$n$-3 may be made with any other suitable conductive material (e.g., temperature independent conductive material, such as metal). In some examples, the first conducting surfaces may be made with the temperature-dependent component, and the second conducting surfaces 522-1-1-522-$n$-1, 522-1-2-522-$n$-2, 522-1-3-522-$n$-3 may be made with a temperature independent conductive material.

In some examples, the temperature-dependent component of each of the capacitor groups 510-1-510-$n$ may have a different threshold temperature from each other. For example, the temperature-dependent component of the first capacitor group 510-1 may have a first threshold temperature (e.g., 10° C.), the temperature-dependent component of the second capacitor group 510-2 may have a second threshold temperature (e.g., 20° C.), . . . and the temperature-dependent component of the n-th capacitor group 510-$n$ may have an n-th threshold temperature (e.g., 65° C.). In some examples, the difference of the threshold temperature of the temperature-dependent components between capacitor groups may be 5, 10, 15, 20° C., or any other suitable degrees.

In some examples, the first component 522-1-1-522-$n$-1 of the second conducting surfaces may be electrically connected to the first electrical contact 511 and the last component 522-1-3-522-$n$-3 of the second conducting surfaces may be electrically connected to the second electrical contact 512. In some examples, each of the adjacent first conducting surfaces **521-1-1-521-*n*-1 and 521-1-2-521-*n*-2 may be separated from each other via a gap 552. In some examples, each of the adjacent second conducting surfaces 522-1-1-522-*n*-1, 522-1-2-522-*n*-2, 522-1-3-522-*n*-3 may be separated from each other via a gap 554, 555. In some examples, each of the adjacent capacitor groups may be separated from each other via a gap 550**.

In some examples, the capacitor groups **510-1-510-*n* may have a (ladder) rung shape. In some examples, the first electrical contact 511, the second electrical contact 512, the capacitor groups (capacitor rungs) 510-1-510-*n* may form a ladder structure as illustrated in FIG. 5. In some examples, the size of each of the first/second conducting surfaces may be about 0.01 to about 0.05 square inches, about 0.05 to about 0.15 square inches, about 0.15 to about 0.5 square inches, or about 0.5 to about 1.0 square inches. In other examples, the first/second conducting surfaces may have any other suitable size. In some examples, the thickness of the first/second conducting surfaces may be about 1 to about 5 mil, about 5 to about 15 mil, about 15 to about 50 mil, or about 50 to about 100 mil. In other examples, the first/second conducting surfaces may have any other suitable thickness. In some examples, the thickness of the dielectric 530-1-530-*n*** may be about 0.1 to about 0.5 mil, about 0.5 to about 1.5 mil, about 1.5 to about 5.0 mil, or about 5.0 to about 10.0 mil. In other examples, the dielectric may have any other suitable thickness. In some examples, the dielectric may include at least one of an olefin, polyethylene, silicon dioxide, paper, and air and combinations thereof. In some examples, the dielectric may include any other suitable non-conductive/dielectric material.

Figure 6:
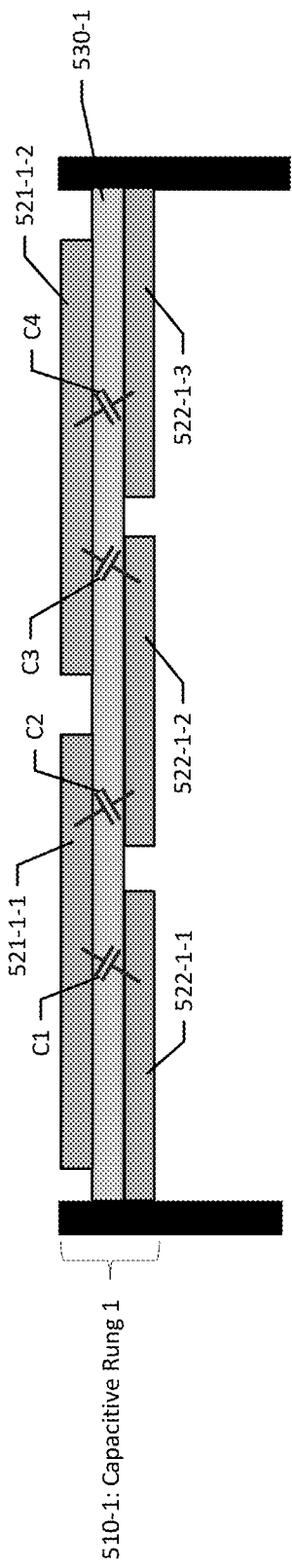
FIG. 6 is a diagram of a capacitor group of the temperature indicator of FIG. 5.
Figure 7:
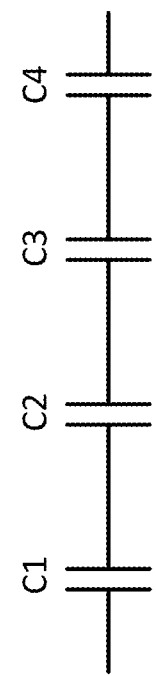
FIG. 7 is a circuit diagram showing the connection of the first to fourth capacitors of the temperature indicator of FIGS. 5 and 6.

In some examples, in each capacitor group, the first conducting surfaces, the dielectric, and the second conducting surfaces may form a plurality of capacitors connected in series. For example, as illustrated in FIG. 6, the first capacitor group 510-1 may include a first capacitor (C1) formed between the second conducting surface 522-1-1 and the first conducting 521-1-1, a second capacitor (C2) formed between the first conducting 521-1-1 and the second conducting surface 522-1-2, a third capacitor (C3) formed between the second conducting surface 522-1-2 and the first conducting 521-1-2, and a fourth capacitor (C4) formed between the first conducting 521-1-2 and the second conducting surface 522-1-3. FIG. 7 shows a circuit diagram of the connection of the first to fourth capacitors. As shown in FIG. 7, the first to fourth capacitors (C1-C4) may be connected in series. The capacitance of the first capacitance group can be calculated according to the following equation:

$$1/C_{cap1tot} = 1/C1 + 1/C2 + 1/C3 + 1/C4 \quad \text{(Equation 1)}$$

The capacitance of a capacitor decreases as the thickness of the dielectric increases when all the other conditions are the same. In the temperature indicator 500, since each capacitor group/rung includes multiple capacitors connected in series, aspects of the temperature indicator 500 may advantageously improve the capacitor rung design flexibility (e.g., capacitance value design). For example, when a product designer wants to design the capacitor rung with a lower capacitance value, by using the capacitor rung structure illustrated in FIG. 5, a lower capacitance value for each capacitor rung (e.g., compared to the capacitance value of each capacitor rung in the temperature indicator 400) can be achieved without having to increase the thickness of the dielectric, thereby saving material cost. In some examples, the length of the gaps 550-555 may be a couple orders of magnitude higher than the thickness of the dielectric **530-1-530-*n* so that any parasitic capacitance formed with the gaps 550-555** becomes negligible (e.g., compared to the capacitances of the capacitors C1-C4 and capacitor groups).

In some examples, the gaps 550-555 may be filed with air. In other examples, the gaps 550-555 may be filed with any other suitable nonconductive material.

After exposure to the temperature above the respective threshold temperature, the change in capacitance of the capacitor groups **510-1-510-*n* may occur abruptly (e.g., a couple orders of magnitude change, or at least about 30 fold difference, 40 fold difference, or 50 fold difference), thereby, working like an on/off switch (between two capacitance values). The abrupt change in capacitance of the temperature-dependent capacitor groups 510-1-510-*n* may occur by the change in conductivity of the temperature-dependent component in each of the capacitor groups 510-1-510-*n*, which practically brings the temperature-dependent capacitor groups in and out of the parallel capacitor structure (e.g., turning on/off or activating/de-activing each capacitor) as the temperature indicator 500** goes through a temperature change (in the range passing the respective threshold temperature(s)).

Figure 8:
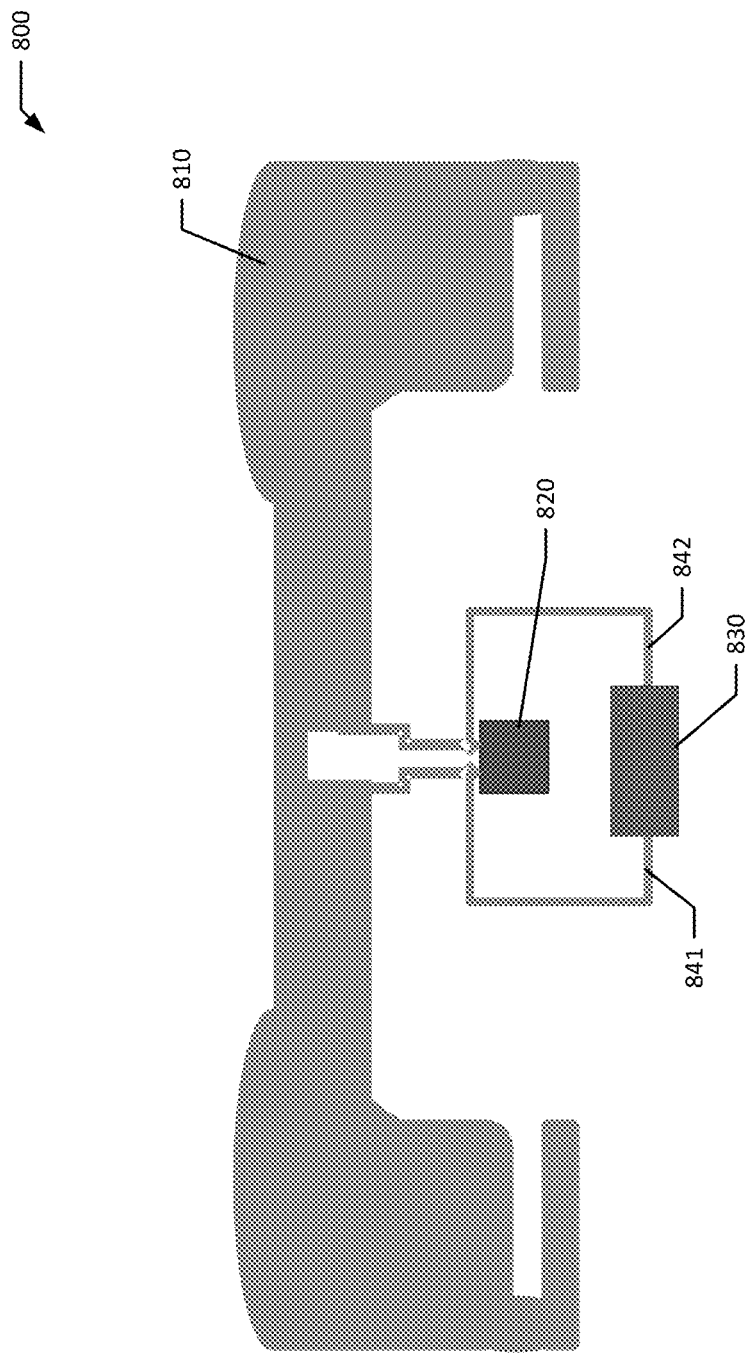
FIG. 8 is a diagram of an RFID tag system according to an example embodiment of the present disclosure.

FIG. 8 illustrates an RFID tag system 800 according to an example embodiment of the present disclosure. The RFID tag system 800 may include an antenna 810, a chip 820 electrically connected to the antenna 810, and a temperature indicator 830 electrically connected to the antenna 810 and the chip 820 (e.g., through the antenna 810). The temperature indicator 830 may be one of the temperature indicators described above (e.g., temperature indicator 100, 200, 300, 400, or 500). The RFID tag system 800 may further include a first contact terminal 841 connected to one side of the temperature indicator 830 and a second contact terminal 842 connected to the other side of the temperature indicator 830. The temperature indicator 830 may be connected to the antenna 810 through the first/second contact terminals 841/842. The first/second contact terminals 841/842 may be the first/second contact terminals described above (e.g., first/second contact terminals 141/142, 241/242, 341/342, 441/442, 541/542). The RFID tag system 800 may be configured to change at least one of a frequency response, a resonant frequency, a phase response, a backscatter signal strength, and an antenna gain in response to temperature exposure dependent changes to capacitance and/or resistance of the temperature indicator 830.

Figure 9:
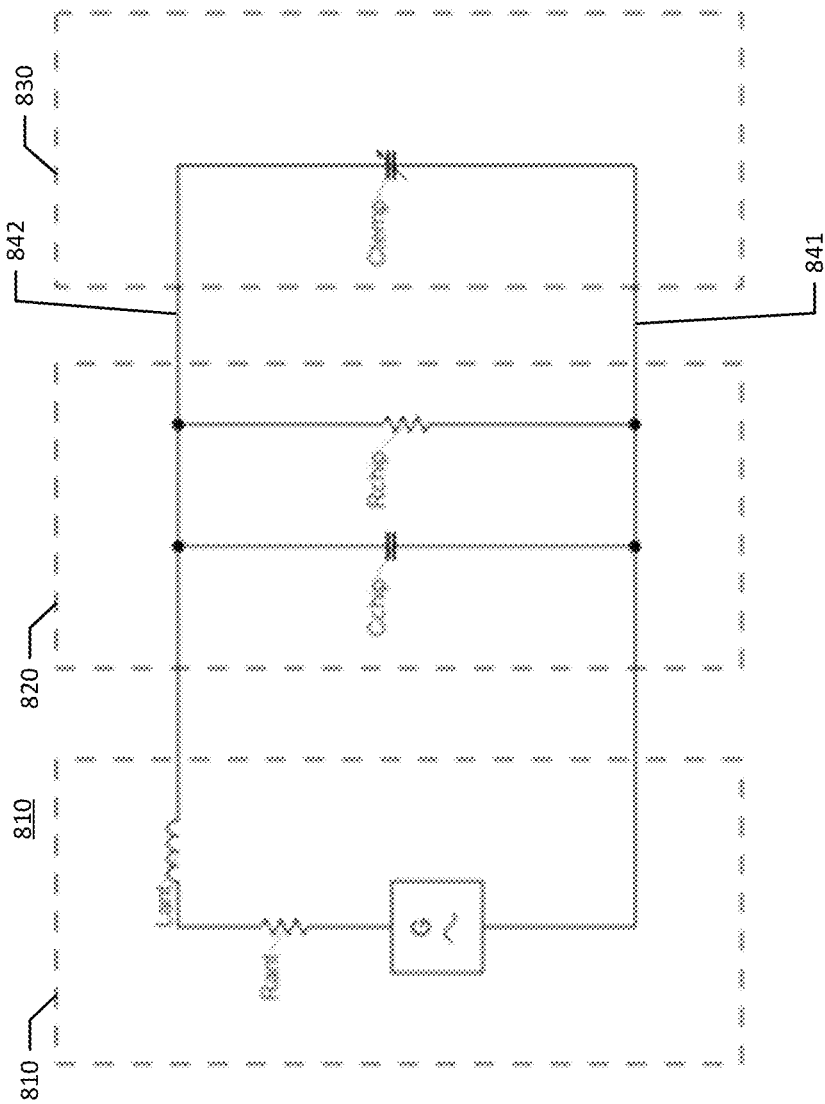
FIG. 9 is a circuit diagram of the RFID tag system of FIG. 8.

FIG. 9 illustrates a circuit diagram of the RFID tag system 800 according to an example embodiment of the present disclosure. As illustrated in FIG. 9 (and FIG. 8), the temperature indicator 830 may be connected to the chip 820 and the antenna 810 in parallel. The frequency response of the RFID tag system 800 may be changed based on respective temperature thresholds of the temperature indicator 830. For example, the respective temperature thresholds of the temperature indicator 830 may be based on the temperature-dependent component (e.g., conductive SCC polymer property) and design of the circuit components/capacitors/capacitor groups. In some examples, a change in capacitance/resistance of the temperature indicator 830 may alter the impedance of the entire circuit in the RFID system 800, thus, changing the frequency response.

In FIG. 9, G may refer to the sinusoidal voltage generated in the RFID tag antenna 810 from a carrier wave transmitted by an RFID reader. $R_{ant}$ may be the resistance of the antenna 810, $L_{ant}$ may be the inductance of the antenna 810, $C_{chip}$ may be the RFID tag's integrated circuit capacitance, $R_{chip}$ may be the RFID tag's integrated circuit Resistance, and $C_{temp}$ may be the tunable/variable capacitance of the temperature indicator 830 that changes, for example, based on threshold temperatures of the temperature-dependent components in the temperature indicator 830. In some examples, the change to the capacitance/resistance is reversible. In other examples, the change to the capacitance/resistance is irreversible.

The resonant frequency $f_r$ of the RFID tag system may be expressed as in the following equation:

$$f_r = \frac{1}{2\pi\sqrt{L_{ant}(C_{chip} + C_{temp})}} \quad \text{(Equation 2)}$$

The change in capacitance can be made as large or small as needed. In some examples, the specific threshold temperatures at which the change in resonant frequency is required can be designed, for example, based on selecting the appropriate material (e.g., conductive SCC polymers) for building the temperature indicator 830.

Figure 10:
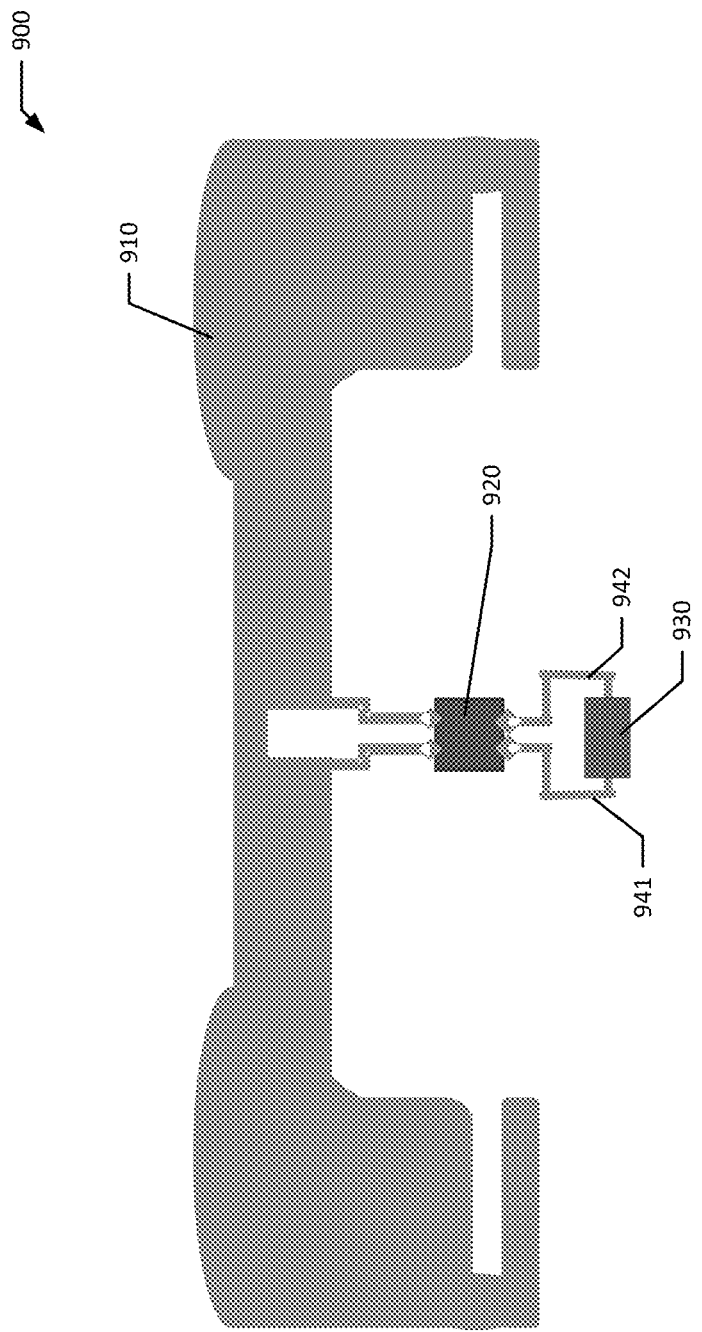
FIG. 10 is a diagram of an RFID tag system according to an example embodiment of the present disclosure.

FIG. 10 illustrates an RFID tag system 900 according to an example embodiment of the present disclosure. The RFID tag system 900 may include an antenna 910, a chip 920 electrically connected to the antenna 910, and a temperature indicator 930 electrically connected to the chip 920 and the antenna 910 (e.g., through the chip 920). The temperature indicator 930 may be one of the temperature indicators described above (e.g., temperature indicator 100, 200, 300, 400, or 500). The RFID tag system 900 may further include a first contact terminal 941 connected to one side of the temperature indicator 930 and a second contact terminal 942 connected to the other side of the temperature indicator 930. The temperature indicator 930 may be connected to the chip 920 through the first/second contact terminals 941/942. The first/second contact terminals 941/942 may be the first/second contact terminals described above (e.g., first/second contact terminals 141/142, 241/242, 341/342, 441/442, 541/542). The RFID tag system 900 may be configured to change at least one of a frequency response, a resonant frequency, a phase response, a backscatter signal strength, and an antenna gain in response to temperature exposure dependent changes to capacitance and/or resistance of the temperature indicator 830. In some examples, the temperature indicator 930 may be connected to dedicated inputs on the RFID chip 920 to detect, for example, capacitance/resistance change. This capacitance/resistance change may be transmitted by the RFID tag to the reader as data bits (along with Tag ID etc.).

In some examples, the temperature indicators 830 and 930 may be fully or partially printed on a rigid or flexible substrate, for example, by screen printing, gravure, flexographic, ink jet, or slot die coating. In other examples, the temperature indicators 830 and 930 may be printed using any other suitable printing methods.

The temperature indicators 100-500 and/or the RFID tag systems 800 and 900 may be used for a temperature-sensitive product having a host product and a container containing the host product. The temperature indicators 100-500 and/or the RFID tag systems 800 and 900 may be associated with the host product and/or the container to monitor a temperature change of the host product/container. For example, the temperature indicators 100-500 and/or the RFID tag systems 800 and 900 may be attached to the host product and/or the container, or at a place near the host product and/or the container. Examples of host products include vaccines, drugs, medication, pharmaceuticals, cosmeceuticals, nutricosmetics, nutritional supplements, biological materials for industrial or therapeutic uses, food stuffs, medical devices, prophylactics, cosmetics, beauty aids, and perishable munitions and ordnance.

In some examples, the capacitance/resistance of the temperature indicators 100-500 may be read using a capacitance meter, resistance meter, or multimeter (e.g., BK 878B). In some examples, the temperature indicators 100-500 may be connected to any suitable RFID chips with dedicated inputs to sense capacitance/resistance change. In such cases, the change in temperature may be detected as a change in capacitance/resistance by the RFID chip and this information can be stored in a user memory and transmitted to an RFID reader.

EXAMPLES

Example 1

An example of change in the resonant frequency of the RFID tag system 800, 900 may be shown in Table 1 below. In this example, the temperature indicator 830, 930 may include a first threshold temperature (10° C.) (of a first circuit component), a second threshold temperature (20° C.) (of a second circuit component), and a third threshold temperature (30° C.) (of a third circuit component).

TABLE 1

First example of change in resonant frequency of RFID tag system in response to temperature changes

| Antenna Inductance (nH) | Chip Capacitance (pF) | Total Capacitance of Temperature Indicator (pF) | Resonant Frequency (MHz) | Temperature (° C.) | Comments |
| --- | --- | --- | --- | --- | --- |
| 25 | 1.1 | 0 | 960 | <10 | Temperature indicator not activated below 10° C. |
| 25 | 1.1 | 0.1 | 919 | Around 10 or above | Temperature indicator activated at first threshold temperature of 10° C. |
| 25 | 1.1 | 0.2 | 883 | Around 20 or above | Temperature indicator activated at second threshold temperature of 20° C. |
| 25 | 1.1 | 0.3 | 851 | Around 30 or above | Temperature indicator activated at third threshold temperature of 30° C. |

As shown in the table above, the total capacitance of the temperature indicator may change from 0 to 0.1 pF after exposure to the temperature around or above the first threshold temperature (10° C.), from 0.1 to 0.2 pF after exposure to the temperature around or above the second threshold temperature (20° C.), and from 0.2 to 0.3 pF after exposure to the temperature around or above the third threshold temperature (30° C.).

Example 2

Another example of change in the resonant frequency of the RFID tag system 800, 900 may be shown in Table 2 below. In this example, the temperature indicator 830, 930 may include a first threshold temperature (2° C.) (of a first circuit component), a second threshold temperature (8° C.) (of a second circuit component), and a third threshold temperature (20° C.) (of a third circuit component).

TABLE 2

Second example of change in resonant frequency of RFID tag system in response to temperature changes

| Antenna Inductance (μH) | Chip Capacitance (pF) | Total Capacitance of Temperature Indicator (pF) | Resonant Frequency (MHz) | Temperature (° C.) | Comments |
|---|---|---|---|---|---|
| 2.65 | 50 | 2 | 13.56 | <2 | Base capacitance value of temperature indicator below 2° C. |
| 2.65 | 50 | 10 | 12.62 | Around 2 or above | Temperature indicator activated at first threshold temperature of 2° C. |
| 2.65 | 50 | 19 | 11.77 | Around 8 or above | Temperature indicator activated at second threshold temperature of 8° C. |
| 2.65 | 50 | 33 | 10.73 | Around 20 or above | Temperature indicator activated at third threshold temperature of 20° C. |

As shown in the table above, the total capacitance of the temperature indicator may change from 2 to 10 pF after exposure to the temperature around or above the first threshold temperature (2° C.), from 10 to 19 pF after exposure to the temperature around or above the second threshold temperature (8° C.), and from 19 to 33 pF after exposure to the temperature around or above the third threshold temperature (20° C.).

Example 3

Another example of change in the resonant frequency of the RFID tag system 800, 900 may be shown in Table 3 below. In this example, the temperature indicator 830, 930 may include a first threshold temperature (20° C.) (of a first circuit component), a second threshold temperature (35° C.) (of a second circuit component), and a third threshold temperature (50° C.) (of a third circuit component).

TABLE 3

Third example of change in resonant frequency of RFID tag system in response to temperature changes

| Antenna Inductance (nH) | Chip Capacitance (pF) | Total Capacitance of Temperature Indicator (pF) | Resonant Frequency (MHz) | Temperature (° C.) | Comments |
|---|---|---|---|---|---|
| 1.0 | 1.1 | 33 | 862 | <20 | Base Capacitance value of Temperature indicator below 20° C. |
| 1.0 | 1.1 | 31 | 902 | Around 20 or above | Temperature indicator activated at first threshold temperature of 20° C. |
| 1.0 | 1.1 | 28 | 933 | Around 35 or above | Temperature indicator activated at second threshold temperature of 35° C. |
| 1.0 | 1.1 | 26 | 967 | Around 50 or above | Temperature indicator activated at third threshold temperature of 50° C. |

As shown in the table above, the total capacitance of the temperature indicator may change from 33 to 31 pF after exposure to the temperature around or above the first threshold temperature (20° C.), from 31 to 28 pF after exposure to the temperature around or above the second threshold temperature (35° C.), and from 28 to 26 pF after exposure to the temperature around or above the third threshold temperature (50° C.).

EMBODIMENTS

Various aspects of the subject matter described herein are set out in the following numbered embodiments:

Embodiment 1. A temperature indicator comprises: a first capacitor configured to change capacitance when exposed to a temperature above a first threshold temperature; and a second capacitor configured to change capacitance when exposed to a temperature above a second threshold temperature, wherein the first capacitor is electrically connected to the second capacitor, wherein the second threshold temperature is different than the first threshold temperature, and wherein the first capacitor and the second capacitor retain their changed capacitance permanently after they return to a temperature below their respective threshold temperature.

Embodiment 2. The temperature indicator of embodiment 1, wherein the change in capacitance of the first capacitor occurs after exposure to the temperature above the first threshold temperature for a first predetermined amount of time or less.

Embodiment 3. The temperature indicator of embodiment 2, wherein the first predetermined amount of time is 1 hour or less.

Embodiment 4. The temperature indicator of embodiment 2, wherein the first predetermined amount of time is 30 seconds or less.

Embodiment 5. The temperature indicator of embodiments 1-4, wherein at least one of the first capacitor and the second capacitor comprises a side-chain crystalline polymer and conductive particles.

Embodiment 6. The temperature indicator of embodiments 1-5, wherein the first capacitor has a first capacitance value before exposure to the temperature above the first threshold temperature and a second capacitance value after exposure to the temperature above the first threshold temperature, wherein the first capacitance is greater than the second capacitance.

Embodiment 7. The temperature indicator of embodiment 6, wherein the second capacitance is zero.

Embodiment 8. The temperature indicator of embodiments 1-7, wherein the first threshold temperature is lower than the second threshold temperature, and wherein a total capacitance of the temperature indicator has: a first total capacitance value before the temperature indicator is exposed to the temperature above the first threshold temperature; a second total capacitance value after the temperature indicator is exposed to a temperature between the first threshold temperature and the second threshold temperature; and a third total capacitance value after the temperature indicator is exposed to the temperature above the second threshold temperature.

Embodiment 9. The temperature indicator of embodiments 1-8, further comprising a third capacitor, wherein the third capacitor is electrically connected with the first capacitor and the second capacitor, wherein the third capacitor is configured to change capacitance when exposed to a temperature above a third threshold temperature, and wherein the third threshold temperature is different than the first threshold temperature and the second threshold temperature.

Embodiment 10. The temperature indicator of embodiments 1-9, wherein each of the first and second capacitors comprises a dielectric, wherein the dielectric comprises at least one selected from the group consisting of an olefin, polyethylene, silicon dioxide, paper, and air and combinations thereof.

Embodiment 11. The temperature indicator of embodiments 1-10, wherein the first capacitor is electrically connected to the second capacitor in parallel.

Embodiment 12. The temperature indicator of embodiments 1-11, further comprises: a first electrical contact; and a second electrical contact; wherein the first capacitor comprises: a first capacitor first conducting surface electrically connected to the first electrical contact; a first capacitor second conducting surface electrically connected to the second electrical contact; and a first dielectric formed between the first capacitor first conducting surface and the first capacitor second conducting surface, wherein the first capacitor first conducting surface comprises a first temperature-dependent component configured to change conductivity when exposed to the temperature above the first threshold temperature, wherein the second capacitor comprises: a second capacitor first conducting surface electrically connected to the first electrical contact; a second capacitor second conducting surface electrically connected to the second electrical contact; and a second dielectric formed between the second capacitor first conducting surface and the second capacitor second conducting surface, wherein the second capacitor first conducting surface comprise a second temperature-dependent component configured to change conductivity when exposed to the temperature above the second threshold temperature.

Embodiment 13. The temperature indicator of embodiment 12, wherein after the first temperature-dependent component returns to a temperature below the first threshold temperature, the first temperature-dependent component retains the changed conductivity.

Embodiment 14. The temperature indicator of any one of embodiments 12 or 13, wherein the first temperature-dependent component and the second temperature-dependent component are conductive before the exposure to the temperature above the first threshold temperature and the second threshold temperature, respectively, and are insulating after the exposure to the temperature above the first threshold temperature and the second threshold temperature, respectively.

Embodiment 15. The temperature indicator of any one of embodiments 12 or 13, wherein the first temperature-dependent component and the second temperature-dependent component are insulating before the exposure to the temperature above the first threshold temperature and the second threshold temperature, respectively, and are conductive after the exposure to the temperature above the first threshold temperature and the second threshold temperature, respectively.

Embodiment 16. The temperature indicator of any one of embodiments 12 or 13, wherein the change in conductivity of the first temperature-dependent component occurs after exposure to the temperature above the first threshold temperature for a first predetermined amount of time or less.

Embodiment 17. The temperature indicator of embodiment 16, wherein the first predetermined amount of time is 1 hour or less.

Embodiment 18. The temperature indicator of embodiment 16, wherein the first predetermined amount of time is 30 seconds or less.

Embodiment 19. The temperature indicator of embodiments 12-18, wherein at least one of the first capacitor second conducting surface and the second capacitor second conducting surface comprises a conductive metal layer.

Embodiment 20. The temperature indicator of embodiments 12-19, wherein the first temperature-dependent component and the second temperature-dependent component each comprise a respective side-chain crystalline polymer and conductive particles.

Embodiment 21. The temperature indicator of embodiments 12-20, wherein the first electrical contact, the second electrical contact, the first capacitor, and the second capacitor form a ladder structure.

Embodiment 22. A temperature indicator comprises: a first electrical contact; a second electrical contact; a first capacitor group comprising: a first capacitor first conducting surface group comprising a plurality of first capacitor first conducting surfaces, wherein the first capacitor first conducting surfaces comprise a first temperature-dependent component, wherein the first capacitor first conducting surfaces are separated from the first and second electrical contacts; and a first capacitor second conducting surface group comprising a plurality of first capacitor second conducting surfaces, wherein a first component among the first capacitor second conducting surfaces is electrically connected to the first electrical contact and a last component among the first capacitor second conducting surfaces is electrically connected to the second electrical contact; and a first dielectric formed between the first capacitor first conducting surface group and the first capacitor second conducting surface group; wherein the first capacitor first conducting surfaces, the first dielectric, and the first capacitor second conducting surfaces form a plurality of first capacitors connected in series; and a second capacitor group comprising: a second capacitor first conducting surface group comprising a plurality of second capacitor first conducting surfaces, wherein the second capacitor first conducting surfaces comprise a second temperature-dependent component, wherein the second capacitor first conducting surfaces are separated from the first and second electrical contacts; a second capacitor second conducting surface group comprising a plurality of second capacitor second conducting surfaces, wherein a first component among the second capacitor second conducting surfaces is electrically connected to the first electrical contact and a last component among the second capacitor second conducting surfaces is electrically connected to the second electrical contact; and a second dielectric formed between the first capacitor first conducting surface group and the first capacitor second conducting surface group, wherein the second capacitor first conducting surfaces, the second dielectric, and the second capacitor second conducting surfaces form a plurality of second capacitors connected in series; wherein the first capacitor group is electrically connected to the second capacitor group, wherein the first temperature-dependent component is configured to change conductivity when exposed to a temperature above a first threshold temperature, wherein the second temperature-dependent component is configured to change conductivity when exposed to a temperature above a second threshold temperature, and wherein the second threshold temperature is different than the first threshold temperature.

Embodiment 23. The temperature indicator of embodiment 22, wherein after the first temperature-dependent component returns to a temperature below the first threshold temperature, the first temperature-dependent component retains the changed conductivity.

Embodiment 24. The temperature indicator of embodiment 22, wherein after the first temperature-dependent component returns to a temperature below the first threshold temperature, the first temperature-dependent component does not retain the changed conductivity.

Embodiment 25. The temperature indicator of any one of embodiments 22, 23, or 24, wherein the first temperature-dependent component and the second temperature-dependent component are conductive before the exposure to the temperature above the first threshold temperature and the second threshold temperature, respectively, and are insulating after the exposure to the temperature above the first threshold temperature and the second threshold temperature, respectively.

Embodiment 26. The temperature indicator of any one of embodiments 22, 23, or 24, wherein the first temperature-dependent component and the second temperature-dependent component are insulating before the exposure to the temperature above the first threshold temperature and the second threshold temperature, respectively, and are conductive after the exposure to the temperature above the first threshold temperature and the second threshold temperature, respectively.

Embodiment 27. The temperature indicator of any one of embodiments 22, 23, or 24, wherein the change in conductivity of the first temperature-dependent component occurs after exposure to the temperature above the first threshold temperature for a first predetermined amount of time or less.

Embodiment 28. The temperature indicator of embodiment 27, wherein the first predetermined amount of time is 1 hour or less.

Embodiment 29. The temperature indicator of embodiment 27, wherein the first predetermined amount of time is 30 seconds or less.

Embodiment 30. The temperature indicator of embodiments 22-29, wherein the first capacitor second conducting surfaces and/or the second capacitor second conducting surfaces comprise a conductive metal layer.

Embodiment 31. The temperature indicator of embodiments 22-30, wherein the first temperature-dependent component and the second temperature-dependent component each comprise a respective side-chain crystalline polymer and conductive particles.

Embodiment 32. The temperature indicator of embodiments 22-31, wherein the first electrical contact, the second electrical contact, the first capacitor, and the second capacitor form a ladder structure.

Embodiment 33. The temperature indicator of embodiments 22-32, wherein the first threshold temperature is lower than the second threshold temperature, and wherein a capacitance of the temperature indicator measured at the first electrical contact and the second electrical contact has: a first capacitance value before the temperature indicator is exposed to the temperature above the first threshold temperature; a second capacitance value after the temperature indicator is exposed to a temperature between the first threshold temperature and the second temperature; and a third capacitance value after the temperature indicator is exposed to the temperature above the second threshold temperature.

Embodiment 34. The temperature indicator of embodiments 22-33, wherein at least one of the first dielectric and the second dielectric comprises at least one selected from the group consisting of an olefin, polyethylene, silicon dioxide, paper, and air and combinations thereof.

Embodiment 35. A temperature indicator comprises: a first temperature-dependent component configured to change conductivity when exposed to a temperature above a first threshold temperature; and a second temperature-dependent component electrically connected to the first temperature-dependent component, wherein the second temperature-dependent component is configured to change conductivity when exposed to a temperature above a second threshold temperature, wherein the second threshold temperature is different than the first threshold temperature, and wherein the first temperature-dependent component and the second temperature-dependent component retain their changed conductivity permanently after they return to a temperature below their respective threshold temperature.

Embodiment 36. The temperature indicator of embodiment 35, wherein the change in conductivity of the first temperature-dependent component occurs after exposure to the temperature above the first threshold temperature for a first predetermined amount of time or less.

Embodiment 37. The temperature indicator of embodiment 36, wherein the first predetermined amount of time is 1 hour or less.

Embodiment 38. The temperature indicator of embodiment 36, wherein the first predetermined amount of time is 30 seconds or less.

Embodiment 39. The temperature indicator of embodiments 35-38, wherein at least one of the first temperature-dependent component and the second temperature-dependent component comprises a side-chain crystalline polymer and conductive particles.

Embodiment 40. The temperature indicator of embodiments 35-39, wherein the first threshold temperature is lower than the second threshold temperature, and wherein a total resistance of the temperature indicator has: a first total resistance value before the temperature indicator is exposed to the temperature above the first threshold temperature; a second total resistance value after the temperature indicator is exposed to a temperature between the first threshold temperature and the second threshold temperature; and a third total resistance value after the temperature indicator is exposed to the temperature above the second threshold temperature.

Embodiment 41. A temperature-sensitive product, comprises: a host product; and the temperature indicator of any one of embodiments 1-40, wherein the temperature indicator is associated with the host product to monitor a temperature change of the host product.

Embodiment 42. An RFID tag comprises: an antenna; and the temperature indicator of any one of embodiments 1-40, wherein the temperature indicator is electrically connected to the antenna, wherein the RFID tag is configured to change at least one of a frequency response, a resonant frequency, a phase response, a backscatter signal strength, and an antenna gain in response to temperature exposure dependent changes to capacitance of the temperature indicator.

Reference throughout the specification to "various aspects," "some aspects," "some examples," "other examples," "some cases," or "one aspect" means that a particular feature, structure, or characteristic described in connection with the aspect is included in at least one example. Thus, appearances of the phrases "in various aspects," "in some aspects," "certain embodiments," "some examples," "other examples," "certain other embodiments," "some cases," or "in one aspect" in places throughout the specification are not necessarily all referring to the same aspect. Furthermore, the particular features, structures, or characteristics illustrated or described in connection with one example may be combined, in whole or in part, with features, structures, or characteristics of one or more other aspects without limitation.

It is to be understood that at least some of the figures and descriptions herein have been simplified to illustrate elements that are relevant for a clear understanding of the disclosure, while eliminating, for purposes of clarity, other elements. Those of ordinary skill in the art will recognize, however, that these and other elements may be desirable. However, because such elements are well known in the art, and because they do not facilitate a better understanding of the disclosure, a discussion of such elements is not provided herein.

The terminology used herein is intended to describe particular embodiments only and is not intended to be limiting of the present disclosure. As used herein, the singular forms "a," "an," and "the" are intended to include the plural forms as well, unless otherwise indicated. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term 'at least one of X or Y' or 'at least one of X and Y' should be interpreted as X, or Y, or X and Y.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A temperature indicator comprising:
a first electrical contact;
a second electrical contact;
a first capacitor group comprising:
a first capacitor first conducting surface group comprising a plurality of first capacitor first conducting surfaces, wherein the first capacitor first conducting surfaces comprise a first temperature-dependent component, wherein the first capacitor first conducting surfaces are separated from the first and second electrical contacts;
a first capacitor second conducting surface group comprising a plurality of first capacitor second conducting surfaces, wherein a first component among the first capacitor second conducting surfaces is electrically connected to the first electrical contact and a last component among the first capacitor second conducting surfaces is electrically connected to the second electrical contact; and
a first dielectric formed between the first capacitor first conducting surface group and the first capacitor second conducting surface group;
wherein the first capacitor first conducting surfaces, the first dielectric, and the first capacitor second conducting surfaces form a plurality of first capacitors connected in series; and
a second capacitor group comprising:
a second capacitor first conducting surface group comprising a plurality of second capacitor first conducting surfaces, wherein the second capacitor first conducting surfaces comprise a second temperature-dependent component, wherein the second capacitor first conducting surfaces are separated from the first and second electrical contacts;
a second capacitor second conducting surface group comprising a plurality of second capacitor second conducting surfaces, wherein a first component among the second capacitor second conducting surfaces is electrically connected to the first electrical contact and a last component among the second capacitor second conducting surfaces is electrically connected to the second electrical contact; and
a second dielectric formed between the first capacitor first conducting surface group and the first capacitor second conducting surface group,
wherein the second capacitor first conducting surfaces, the second dielectric, and the second capacitor second conducting surfaces form a plurality of second capacitors connected in series;
wherein the first capacitor group is electrically connected to the second capacitor group,
wherein the first temperature-dependent component is configured to change conductivity when exposed to a temperature above a first threshold temperature,
wherein the second temperature-dependent component is configured to change conductivity when exposed to a temperature above a second threshold temperature, and
wherein the second threshold temperature is different than the first threshold temperature.

2. The temperature indicator of claim 1, wherein after the first temperature-dependent component returns to a temperature below the first threshold temperature, the first temperature-dependent component retains the changed conductivity.

3. The temperature indicator of claim 1, wherein the first temperature-dependent component and the second temperature-dependent component are conductive before the exposure to the temperature above the first threshold temperature and the second threshold temperature, respectively, and are insulating after the exposure to the temperature above the first threshold temperature and the second threshold temperature, respectively.

4. The temperature indicator of claim 1, wherein the first temperature-dependent component and the second temperature-dependent component each comprise a respective side-chain crystalline polymer and conductive particles.

5. The temperature indicator of claim 1, wherein the first electrical contact, the second electrical contact, the first capacitor group, and the second capacitor group form a ladder structure.

6. The temperature indicator of claim 1, wherein the first threshold temperature is lower than the second threshold temperature, and wherein a capacitance of the temperature indicator measured at the first electrical contact and the second electrical contact has:
- a first capacitance value before the temperature indicator is exposed to the temperature above the first threshold temperature;
- a second capacitance value after the temperature indicator is exposed to a temperature between the first threshold temperature and the second temperature; and
- a third capacitance value after the temperature indicator is exposed to the temperature above the second threshold temperature.

7. A temperature-sensitive product, comprising:
a host product; and
the temperature indicator of claim 1,
wherein the temperature indicator is associated with the host product to monitor a temperature change of the host product.

8. An RFID tag comprising:
an antenna; and
the temperature indicator of claim 1,
wherein the temperature indicator is electrically connected to the antenna,
wherein the RFID tag is configured to change at least one of a frequency response, a resonant frequency, a phase response, a backscatter signal strength, and an antenna gain in response to temperature exposure dependent changes to capacitance of the temperature indicator.

9. The temperature indicator of claim 1, wherein after the first temperature-dependent component returns to a temperature below the first threshold temperature, the first temperature-dependent component does not retain the changed conductivity.

10. The temperature indicator of claim 1, wherein the first temperature-dependent component and the second temperature-dependent component are insulating before the exposure to the temperature above the first threshold temperature and the second threshold temperature, respectively, and are conductive after the exposure to the temperature above the first threshold temperature and the second threshold temperature, respectively.

11. The temperature indicator of claim 1, wherein the change in conductivity of the first temperature-dependent component occurs after exposure to the temperature above the first threshold temperature for a first predetermined amount of time or less.

12. The temperature indicator of claim 11, wherein the first predetermined amount of time is 1 hour or less.

13. The temperature indicator of claim 11, wherein the first predetermined amount of time is 30 seconds or less.

14. The temperature indicator of claim 1, wherein the first capacitor second conducting surfaces and/or the second capacitor second conducting surfaces comprise a conductive metal layer.

15. The temperature indicator of claim 1, wherein at least one of the first dielectric and the second dielectric comprises at least one selected from the group consisting of an olefin, polyethylene, silicon dioxide, paper, and air and combinations thereof.

16. The temperature indicator of claim 1, wherein the first capacitor group is electrically connected to the second capacitor group in parallel.

* * * * *